United States Patent
Liu et al.

(10) Patent No.: US 10,306,265 B2
(45) Date of Patent: May 28, 2019

(54) SIMPLIFICATION OF SEGMENT-WISE DC CODING OF LARGE PREDICTION BLOCKS IN 3D VIDEO CODING

(71) Applicant: QUALCOMM Incorporated, San Diego, CA (US)

(72) Inventors: Hongbin Liu, Beijing (CN); Ying Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 168 days.

(21) Appl. No.: 15/108,764

(22) PCT Filed: Dec. 30, 2013

(86) PCT No.: PCT/CN2013/001663
§ 371 (c)(1),
(2) Date: Jun. 28, 2016

(87) PCT Pub. No.: WO2015/100515
PCT Pub. Date: Jul. 9, 2015

(65) Prior Publication Data
US 2016/0330480 A1 Nov. 10, 2016

(51) Int. Cl.
*H04N 19/597* (2014.01)
*H04N 19/96* (2014.01)
(Continued)

(52) U.S. Cl.
CPC ......... *H04N 19/597* (2014.11); *H04N 13/161* (2018.05); *H04N 19/176* (2014.11);
(Continued)

(58) Field of Classification Search
CPC .. H04N 19/597; H04N 19/176; H04N 19/593; H04N 19/70; H04N 19/96; H04N 13/0048
(Continued)

(56) References Cited

U.S. PATENT DOCUMENTS 9,497,485 B2 * 11/2016 Deng .................. H04N 19/187
9,544,612 B2 * 1/2017 Deng ................. H04N 13/0048
(Continued)

FOREIGN PATENT DOCUMENTS

| CN | 102263952 A | 11/2011 |
| CN | 103039073 A | 4/2013 |

(Continued)

OTHER PUBLICATIONS

Gu Z., et al., "3D-CE5.h related: Simplified DC predictor improvement for depth intra modes," 6th Meeting: Geneva, Switzerland, Joint Collaborative Team on 3D Video Coding Extension Development of ITU-T SG 16 WP 3 and ISO/IEC JTC 1/SC 29/WG 11, Oct. 25, 2013-Nov. 1, 2013, JCT3V-F0157, XP030131593, 6 pages.
(Continued)

*Primary Examiner* — William C Vaughn, Jr.
*Assistant Examiner* — Jae N Noh
(74) *Attorney, Agent, or Firm* — Shumaker & Sieffert, P.A.

(57) ABSTRACT

In general, this disclosure describes techniques for simplifying SDC coding of large intra-prediction blocks, such as 64×64 blocks, in a 3D video coding process, such as 3D-HEVC. In some examples, the techniques may include processing 64×64 intra-prediction blocks as four 32×32 intra-prediction blocks in intra SDC. Processing large intra-prediction blocks as multiple, smaller intra-prediction blocks in intra SDC may reduce maximum buffer size requirements in the intra SDC process.

43 Claims, 9 Drawing Sheets

(51) Int. Cl.
*H04N 19/593* (2014.01)
*H04N 19/176* (2014.01)
*H04N 13/161* (2018.01)
*H04N 19/70* (2014.01)

(52) U.S. Cl.
CPC ........... *H04N 19/593* (2014.11); *H04N 19/96* (2014.11); *H04N 19/70* (2014.11)

(58) Field of Classification Search
USPC ................................................ 375/240.12
See application file for complete search history.

(56) References Cited

U.S. PATENT DOCUMENTS

| | | | |
|---|---|---|---|
| 9,762,914 | B2* | 9/2017 | Gu .......................... H04N 19/13 |
| 2013/0034170 | A1 | 2/2013 | Chen et al. |
| 2013/0051469 | A1* | 2/2013 | Park ...................... H04N 19/159 |
| | | | 375/240.14 |
| 2014/0044347 | A1 | 2/2014 | Sato et al. |
| 2015/0256841 | A1 | 9/2015 | Yie et al. |
| 2016/0212446 | A1 | 7/2016 | Liu et al. |

FOREIGN PATENT DOCUMENTS

| | | | |
|---|---|---|---|
| EP | 2536151 | A2 | 12/2012 |
| JP | 2013509022 | A | 3/2013 |
| KR | 20130078320 | A | 7/2013 |
| WO | 2008044191 | A1 | 4/2008 |
| WO | 2011046607 | A2 | 4/2011 |
| WO | 2012147740 | A1 | 11/2012 |

OTHER PUBLICATIONS

Supplementary European Search Report—EP13900607—Search Authority—Munich—dated Jul. 21, 2017, 8 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Tech, et al., "3D-HEVC Draft Text 2," JCT-3V Meeting; (Joint Collaborative Team on Video Coding of ISO/IEC JTC1/SC29/WG11 and ITU-T SG.16); Oct. 25-Nov. 1, 2013; No. JCT3V-F1001_v1; Nov. 15, 2013; 98 pp.

Liu, et al., "CE5 related: Generic SDC for all Intra modes in 3D-HEVC," JCT-3V Meeting; (Joint Collaborative Team on Video Coding of ISO/IEC JTC1/SC29/WG11 and ITU-T SG.16); Oct. 25-Nov. 1, 2013; No. JCT3V-F0126; Oct. 27, 2013; 8 pp.

ITU-T H.223, Series H: Audiovisual and Multimedia Systems, Infrastructure of audiovisual services—Transmission multiplexing and synchronization, Multiplexing protocol for low bit rate multimedia communication, Advanced video coding for generic audiovisual services, The International Telecommunication Union. Jul. 2001, 74 pp.

International Search Report and Written Opinion from International Application No. PCT/CN2013/001663, dated Oct. 10, 2014, 13 pp.

International Preliminary Report on Patentability from International Application No. PCT/CN2013/001663, dated Sep. 26, 2014, 5 pp.

Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

Yu, et al., "CE5 related: Simplification of 64×64 Intra SDC mode in 3D-HEVC," JCT-3V Meeting; Jan. 11-17, 2014; (Joint Collaborative Team on Video Coding of ISO/IEC JTC1/SC29/WG11 and ITU-T SG.16); Jan. 3, 2014; No. JCT3V-G0123, 4 pp.

Wiegand T., et al., "High Efficiency Video Coding (HEVC) text specification Working Draft 1," 3, JCT-VC Meeting; 95, MPEG Meeting; Oct. 7, 2010-Oct. 15, 2010; Guangzhou, CN (Joint Collaborative Team on Video Coding of ISO/ECJTC1/SC29/WG11 and ITU-T SG.16 ); URL: http:/iwftp3.1tu.int/av-arch/jctvc-site/, No. JCTVC-C403, 137 pp., Jan. 6, 2011 (Jan. 6, 2011), XP030008032, ISSN: 0000-0018.

* cited by examiner

US 10,306,265 B2

SIMPLIFICATION OF SEGMENT-WISE DC CODING OF LARGE PREDICTION BLOCKS IN 3D VIDEO CODING

This application is a national stage entry under 35 U.S.C. § 371 of International Application No. PCT/CN2013/001663, filed Dec. 30, 2013.

TECHNICAL FIELD

This disclosure relates to video coding, and more particularly, to segment-wise DC coding (SDC) in a three-dimensional (3D) video coding process.

BACKGROUND

Digital video capabilities can be incorporated into a wide range of devices, including digital televisions, digital direct broadcast systems, wireless broadcast systems, tablet computers, smartphones, personal digital assistants (PDAs), laptop or desktop computers, digital cameras, digital recording devices, digital media players, video gaming devices, video game consoles, cellular or satellite radio telephones, video teleconferencing devices, set-top devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive and store digital video information more efficiently.

An encoder-decoder (codec) applies video compression techniques to perform spatial (intra-picture) prediction and/or temporal (inter-picture) prediction to reduce or remove redundancy inherent in video sequences. For block-based video coding, a video slice may be partitioned into video blocks, which may also be referred to as coded treeblocks (CTBs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures alternatively may be referred to as frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the spatial domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

A multi-view coding bitstream may be generated by encoding views, e.g., from multiple perspectives. Multiview coding may allow a decoder to select different views, or possibly render multiple views. In addition, some three-dimensional (3D) video techniques and standards that have been developed, or are under development, make use of multiview coding aspects. For example, in some 3D video coding processes, different views may be used to transmit left and right eye views to support 3D video. Other 3D video coding processes may use multiview-plus-depth coding. In a multiview-plus-depth coding process, such as a process defined by the 3D-HEVC extension to HEVC, a 3D video bitstream may contain multiple views that include not only texture view components, but also depth view components. For example, a given view may comprise a texture view component and a depth view component. The texture view and depth view components may be used to construct 3D video data.

SUMMARY

In general, this disclosure describes techniques for simplifying SDC coding of large intra-prediction blocks, such as 64×64 blocks, in a 3D video coding process, such as a process consistent with the 3D-HEVC extension to HEVC. In some examples, the techniques may include processing 64×64 intra-prediction blocks as four 32×32 intra-prediction blocks in intra SDC. Processing large intra-prediction blocks as multiple, smaller intra-prediction blocks in intra SDC may reduce maximum buffer size requirements in the intra SDC process.

In one example, the disclosure describes a method of decoding depth data for video coding, the method comprising, for an intra-prediction mode for a first block of depth data, intra-predicting samples of the depth data for second blocks, wherein the second blocks comprise four blocks each having an equal size that is one-quarter of a size of the first block of depth data, and correspond to upper left, upper right, lower left and lower right blocks of the first block of depth data, receiving residual data for the first block of depth data indicating a difference between pixel values of the first block and the intra-predicted samples of the second blocks, and reconstructing the first block of depth data based on the intra-predicted samples for the second blocks and the residual data.

In another example, the disclosure describes a method of encoding depth data for video coding, the method comprising, for an intra-prediction mode for a first block of depth data, intra-predicting samples of the depth data for second blocks, wherein the second blocks comprise four blocks each having an equal size that is one-quarter of a size of the first block of depth data, and correspond to upper left, upper right, lower left and lower right blocks of the first block of depth data, generating residual data for the first block based on a difference between pixel values of the first block and the intra-predicted samples of the second blocks, and encoding the first block of depth data based on the intra-prediction mode and the residual data.

In another example, the disclosure describes a device for coding depth data for video coding, the device comprising a memory storing depth data for video coding, and one or more processors configured to, for an intra-prediction mode for a first block of depth data, intra-predict samples of the depth data for second blocks, wherein the second blocks comprise four blocks each having an equal size that is one-quarter of a size of the first block of depth data, and correspond to upper left, upper right, lower left and lower right blocks of the first block of depth data, and code the first block of depth data based on the intra-prediction mode and residual data for the first block indicating a difference between pixel values of the first block and the intra-predicted samples of the second blocks.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
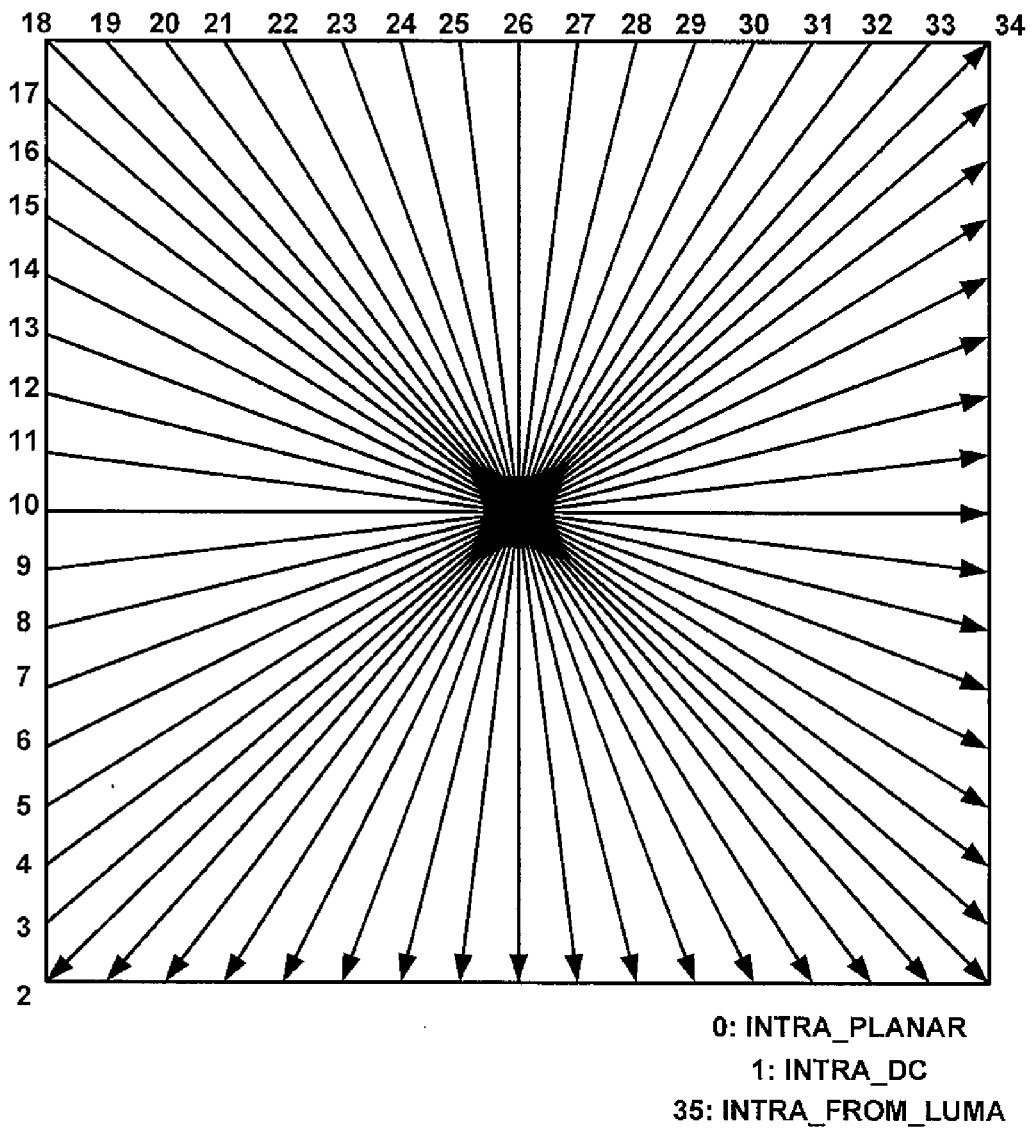
FIG. 1 is a diagram illustrating intra prediction modes used in HEVC.

This disclosure describes techniques for simplifying segment-wise DC coding (SDC) for large intra-prediction blocks, such as 64×64 blocks, in a 3D video coding process, such as 3D-HEVC. In the HEVC main profile, the largest intra prediction size is 32×32. However, in the intra SDC mode of 3D-HEVC, the largest intra prediction size of Planar mode is 64×64. In addition, it has been proposed, in JCT3V-F0126, Liu et al., "CE5 related: Generic SDC for all Intra modes in 3D-HEVC," Joint Collaborative Team on 3D Video Coding Extensions of ITU-T SG 16 WP 3 and ISO/IEC JTC 1/SC 29/WG 11, 6th Meeting: Geneva, Switzerland, 25 Oct.-1 Nov. 2013, that, in depth coding, SDC can be applied for the additional depth Intra prediction modes and original HEVC Intra prediction modes.

In this disclosure, 32×32, 64×64, or other N×N expressions, when used in the context of pixels, reference samples or prediction samples, may refer to a number of pixels, reference samples or prediction samples associated with a block of video data. The pixels, reference samples or prediction samples may be associated with luma, chroma or depth components of video data. In general, N×N pixels or samples yield $N^2$ total pixels or samples in a block, where the block includes N pixels or samples in one dimension, e.g., a horizontal dimension, and N pixels or samples in another dimension, e.g., a vertical dimension.

With the proposal in JCT3V-F0126, the largest intra prediction size of all HEVC intra prediction modes is 64×64. Therefore, when compared with HEVC, both 3D-HEVC and the proposal in JCT3V-F0126 increase the maximum buffer size used for intra prediction. In some examples, the disclosure describes techniques for simplification of 64×64 SDC coding in 3D-HEVC. To simplify SDC coding of large intra-prediction blocks, such as 64×64 blocks, in a 3D video coding process, such as 3D-HEVC, the disclosure describes techniques that may include processing large intra-prediction blocks, e.g., 64×64 intra-prediction blocks, as four smaller intra-prediction blocks, e.g., four 32×32 intra-prediction blocks, in intra SDC. In this manner, in intra SDC, a 64×64 intra prediction block with HEVC intra prediction modes is processed as four 32×32 intra prediction sub-blocks. Processing large intra-prediction blocks as multiple, smaller intra-prediction blocks in intra SDC may reduce maximum buffer size requirements in the intra SDC process.

In SDC, a video encoder generates a delta DC residual value to represent the difference between the pixels of a coded prediction unit (PU) or PU partition of a depth coding unit (CU) and the predicted samples of a predicted PU or PU partition. The PU may have a single partition or two or more partitions defined according to partitioning modes such as depth map modeling (DMM) modes. In SDC, the delta DC value is a single value that represents the difference between an average value of the pixels of a PU or partition and an average value of prediction samples of a predicted PU or partition. To reconstruct the PU or PU partition, the single delta DC value is summed with the values of each of the prediction samples of the predicted PU or PU partition.

In this section, video coding standards and HEVC techniques related to this disclosure are reviewed. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

In addition, there is a new upcoming video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent draft of the HEVC standard, JCTVC-L1003, Benjamin Bross, Woo-Jin Han, Jens-Ranier Ohm, Gary Sullivan, Ye-Kui Wang, Thomas Wiegand, "High Efficiency Video Coding (HEVC) text specification draft 10 (for FDIS & Last Call)," Joint Collaborative Team on Video Coding (JCT-VC) of ITU-T SG 16 WP 3 and ISO/IEC JTC 1/SC 29/WG 11, 12th Meeting: Geneva, CH, 14-23 Jan. 2013 ("HEVC WD 10"), is incorporated herein by reference in its entirety, and is available from the following link:
http://phenix.it-sudparis.eu/jct/doc_end_user/documents/12_Geneva/wg11/JCTVC-L1003-v34.zip FIG. 1 is a diagram illustrating intra prediction modes used in HEVC. FIG. 1 generally illustrates the prediction directions associated with various directional intra-prediction modes available for intra-coding in HEVC. In the current HEVC, e.g., as described in HEVC WD 10, for the luma component of each Prediction Unit (PU), an intra prediction method is utilized with 33 directional (angular) prediction modes (indexed from 2 to 34), DC mode (indexed with 1) and Planar mode (indexed with 0), as shown in FIG. 1.

In the Planar mode (indexed with 0), prediction is performed using a so-called "plane" function to determine predictor values for each of the pixels within a block of video data, e.g., PU. According to the DC mode (indexed with 1), prediction is performed using an averaging of pixel values within the block to determine predictor values for each of the pixels within the block. According to a directional prediction mode, prediction is performed based on a neighboring block's reconstructed pixels along a particular direction (as indicated by the mode). In general, the tail end of the arrows shown in FIG. 1 represents a relative one of neighboring pixels from which a value is retrieved, while the head of the arrows represents the direction in which the retrieved value is propagated to form a predictive block.

For HEVC intra prediction modes, a video encoder and/or video decoder generates a pixel specific predictor value for each pixel in the PU using the various modes discussed above, e.g., by using neighboring samples of the PU for modes 2 to 34. A video encoder determines residual values for the video block based on the differences between the actual depth values and the predictor values for the pixels of the block, and provides the residual values to a video decoder. According to HEVC WD 10, a video encoder transforms the residual values and quantizes the transform coefficients, and may also entropy encode the quantized transform coefficients. A video decoder (e.g., after entropy decoding, inverse quantizing, and inverse transforming) determines reconstructed values for the pixels of the block by adding the residual values to the predictor values. Further details regarding HEVC intra prediction modes are specified in HEVC WD 10. In SDC, a single delta DC residual value is coded for each predicted PU or partition. In addition, the delta DC residual value is not transformed or quantized.

Figure 2:
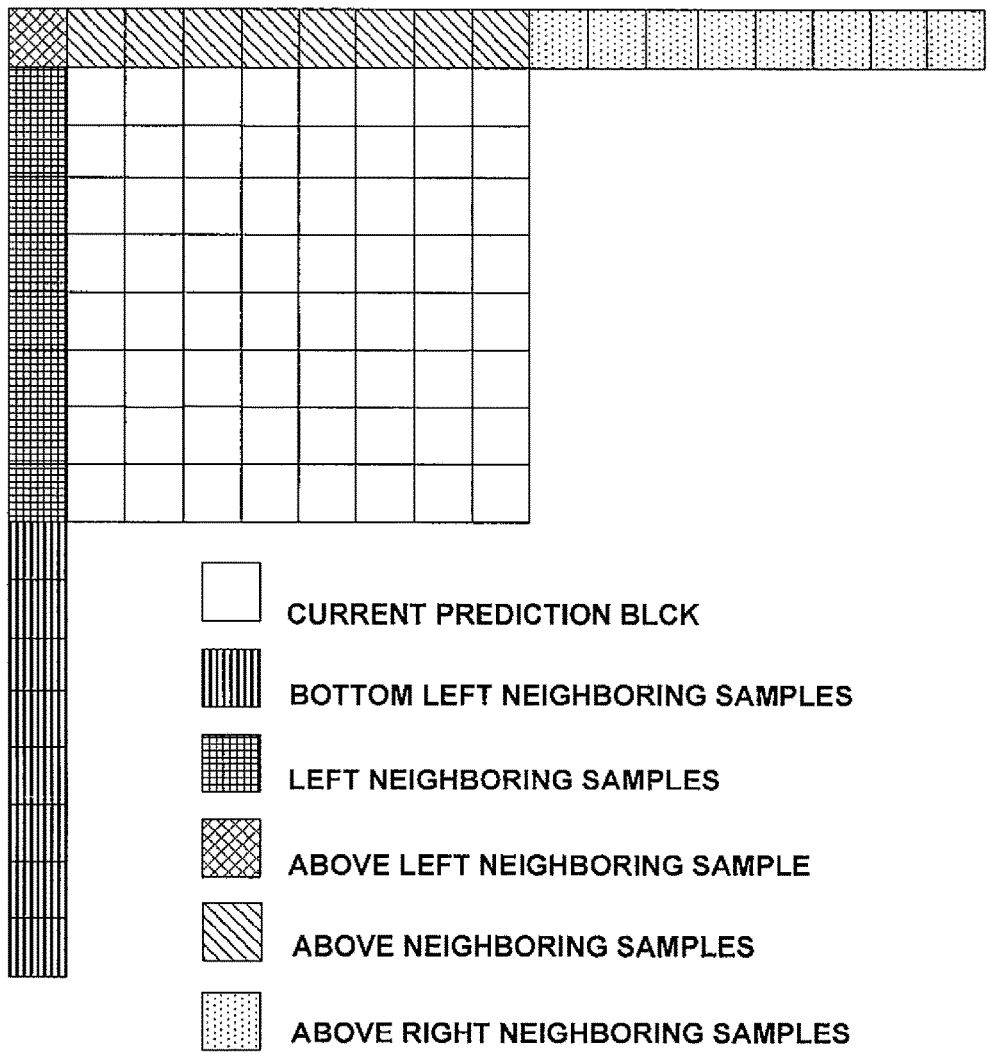
FIG. 2 is a diagram illustrating neighboring samples used in intra-prediction modes in HEVC.

FIG. 2 is a diagram illustrating neighboring samples used in intra-prediction modes in HEVC. As shown in FIG. 2, various directional intra-prediction modes for pixels of a current prediction block may rely on the spatially neighboring samples or combinations of such neighboring samples. In particular, in the intra prediction process, bottom left neighboring samples, left neighboring samples, the above left neighboring sample, above neighboring samples and above right neighboring reconstructed samples, as shown in FIG. 2, are used if they are available. The neighboring samples may be obtained from adjacent blocks that spatially neighbor the current block to be intra-coded, e.g., within the same picture or view.

In JCT-3V, two HEVC extensions, the multiview extension (MV-HEVC) and 3D video extension (3D-HEVC) are being developed. A recent version of the reference software, "3D-HTM version 9.0," for 3D-HEVC is incorporated herein by reference in its entirety, and can be downloaded from the following link:
[3D-HTM version 9.0]:
https://hevc.hhi.fraunhofer.de/svn/svn_3DVCSoftware/tags/HTM-9.0/

A recent draft of 3D-HEVC is presented in JCTVC-F1001-v2, Gerhard Tech, Krzysztof Wegner, Ying Chen, and Sehoon Yea, "3D-HEVC Draft Text 2," Joint Collaborative Team on 3D Video Coding Extension Development of ITU-T SG 16 WP 3 and ISO/IEC JTC 1/SC 29/WG 11, 6th Meeting: Geneva, CH, 25 Oct.-1 Nov. 2013 (referred to hereinafter as "F1001" or "3D-HEVC WD"), is incorporated herein by reference in its entirety, and is available from the following link:
http://phenix.it-sudparis.eu/jct2/doc_end_user/documents/6_Geneva/wg11/JCT3V-F1001-v2.zip In 3D-HEVC, as defined in the 3D-HEVC WD referenced above, each access unit contains multiple pictures, and each of the pictures in each view has a unique view identification (id), or view order index. However, the depth picture and texture picture of the same view may have different layer ids.

Depth coding in 3D video coding will now be described. 3D video data is represented using the multiview video plus depth format, in which captured views (texture) are associated with corresponding depth maps. In 3D video coding, textures and depth maps are coded and multiplexed into a 3D video bitstream. Depth maps are coded as a grayscale video where the luma samples represent the depth values, and conventional intra- and inter-coding methods can be applied for depth map coding.

Depth maps may be characterized by sharp edges and constant areas. Due to the different statistics of depth map samples, different coding schemes are designed for depth maps based on a 2D video codec. In a multiview plus depth coding process, a view may include a texture component and a depth component. Depth coding units (CU's) in the depth component may be inter-coded or intra-coded. The depth CU's may be divided into one or more PU's, and the PU's may be divided into one or more partitions.

The partitions may be intra-predicted or inter-predicted, and a depth residual may be coded using, in some examples, a segment-wise DC residual coding (SDC). In SDC, a delta DC residual value representing a difference between a coded PU partition and an intra- or inter-coded PU partition may be coded. In particular, the delta DC value may be a single value for an entire PU or PU partition. The single value may represent a difference between an average of pixel values of the coded PU partition and an average of prediction samples of the inter- or intra-predicted PU or partition.

Figure 3:
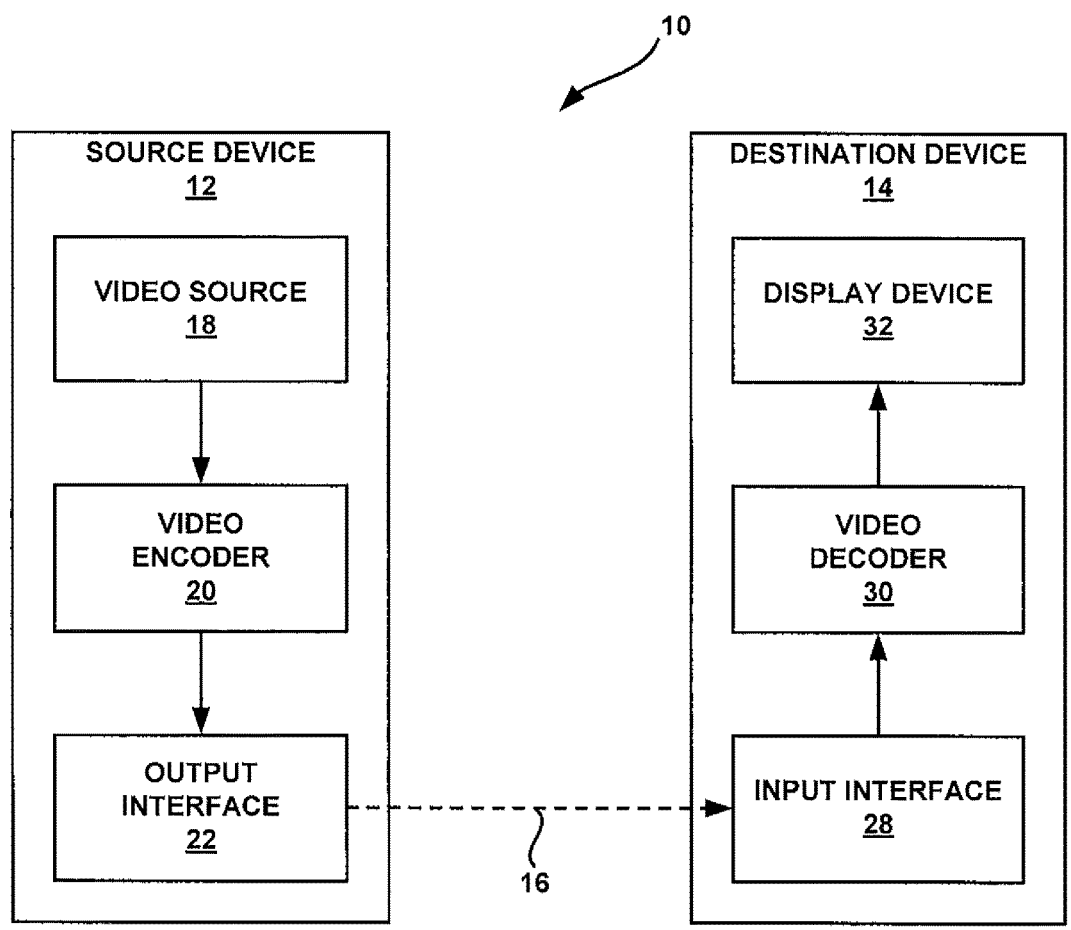
FIG. 3 is a block diagram illustrating an example video coding system that may utilize the techniques of this disclosure.

FIG. 3 is a block diagram illustrating an example video encoding and decoding system 10 that may be configured to utilize various techniques of this disclosure, such as techniques for simplifying segment-wise DC coding (SDC) for large intra-prediction blocks, such as 64×64 blocks, in a 3D video coding process, such as 3D-HEVC. In some examples, video encoder 20 and/or video decoder 30 of system 10 may be configured to process large 64×64 intra-prediction blocks, e.g., 64×64 intra-prediction blocks, as four smaller intra-prediction blocks, e.g., four 32×32 intra-prediction blocks, in intra SDC. In this manner, in intra SDC, 64×64 intra prediction of HEVC intra prediction modes is processed as four 32×32 intra prediction. In some cases, processing large intra-prediction blocks as multiple, smaller intra-prediction blocks in intra SDC may reduce maximum buffer size requirements in the intra SDC process for encoder 20 and/or decoder 30.

As shown in FIG. 3, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium, such as a transmission channel, to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a computer-readable storage medium, such as a non-transitory computer-readable storage medium, i.e., a data storage device. Similarly, encoded data may be accessed from the storage device by input interface. The storage device may include any of a variety of distributed or locally accessed non-transitory data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure may be applied to video coding in support of any of a variety of wired or wireless multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 3, source device 12 includes video source 18, video encoder 20, and output interface 22. Destination device 14 includes input interface 28, video decoder 30, and display device 32. In accordance with this disclosure, video encoder 20 of source device 12 may be configured to apply techniques for simplified delta DC coding for depth coding in a 3D video coding process, such as 3D-HEVC. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 3 is merely one example. Techniques described in this disclosure may be performed by a digital video encoding and/or decoding device. Although generally the techniques of this disclosure are performed by a video encoder 20 and/or video decoder 30, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer generated video. In some cases, if video source 18 is a video camera, source device 12 and destination device 14 may form so-called smart phones, tablet computers or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or data storage media (that is, non-transitory storage media). In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers or in payloads of various encoded portions of video data. In some cases, such syntax elements may be encoded and stored (e.g., stored to computer-readable medium 16) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, a projection device, or another type of display device.

Although not shown in FIG. 3, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, as one example, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Video encoder 20 and video decoder 30 may operate according to a video coding standard, such as the HEVC standard and, more particularly, the 3D-HEVC extension of the HEVC standard, as referenced in this disclosure, e.g., by document F1001 or 3D-HEVC WD. HEVC presumes several additional capabilities of video coding devices relative to devices configured to perform coding according to other processes, such as, e.g., ITU-T H.264/AVC. For example, whereas H.264 provides nine intra-prediction encoding modes, the HM may provide as many as thirty-five intra-prediction encoding modes.

Some basic aspects of HEVC will now be discussed. In general, HEVC specifies that a video picture (or "frame") may be divided into a sequence of largest coding units referred to as coding tree units (CTUs). A CTU includes corresponding luma and chroma components, referred to as coded tree blocks (CTB), e.g., luma CTB and chroma CTBs, including luma and chroma samples, respectively. Syntax data within a bitstream may define a size for the CTU, which is a largest coding unit in terms of the number of pixels. A slice includes a number of consecutive CTBs in coding order. A picture may be partitioned into one or more slices. Each CTB may be split into coding units (CUs) according to a quadtree partitioning structure. In general, a quadtree data structure includes one node per CU, with a root node corresponding to the CTB. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. Four sub-CUs of a leaf-CU may also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU in HEVC has a similar purpose as a macroblock of the H.264 standard, except that a CU does not have a size distinction. For example, a CTB may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a CTB may be split, referred to as a maximum CU depth, and may also define a minimum size of the coding nodes. Accordingly, in some examples, a bitstream may also define a smallest coding unit.

A CU includes a coding node and prediction units (PUs) and transform units (TUs) associated with the coding node. This disclosure may use the term "block" to refer to any of a CU, prediction unit (PU), transform unit (TU), or partition thereof, in the context of HEVC, or similar data structures in the context of other standards. A size of the CU corresponds to a size of the coding node. The size of the CU may range from 8×8 pixels up to the size of the CTB with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape, or include partitions that are non-rectangular in shape, in the case of depth coding as described in this disclosure. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned CTB, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized. In SDC, however, delta DC residual values typically are not transformed or quantized.

A leaf-CU may include one or more prediction units (PUs). In general, a PU represents a spatial area corresponding to all or a portion of the corresponding CU, and may include data for retrieving reference samples for the PU. The reference samples may be pixels from a reference block. In some examples, the reference samples may be obtained from a reference block, or generated, e.g., by interpolation or other techniques. A PU also includes data related to prediction. For example, when the PU is intra-mode encoded, data for the PU may be included in a residual quadtree (RQT), which may include data describing an intra-prediction mode for a TU corresponding to the PU.

As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., RefPicList 0 or RefPicList 1) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a CTB. TUs of the RQT that are not split are referred to as leaf-TUs. In general, this disclosure uses the terms CU and TU to refer to a leaf-CU and leaf-TU, respectively, unless noted otherwise.

A video sequence typically includes a series of pictures. As described herein, "picture" and "frame" may be used interchangeably. That is, a picture containing video data may be referred to as a video frame, or simply a "frame." A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, HEVC supports prediction in various PU sizes. Assuming that the size of a particular CU is 2N×2N, HEVC supports intra prediction in PU sizes of 2N×2N or N×N, and inter prediction in symmetric PU sizes of 2N×2N, 2N×N, N×2N, or N×N. A PU having a size of 2N×2N represents an undivided CU, as it is the same size as the CU in which it resides. In other words, a 2N×2N PU is the same size as its CU. HEVC supports asymmetric partitioning for inter prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom. For depth coding, the 3D-HEVC WD further supports partitioning of PU's according to depth modeling modes (DMMs), including non-rectangular partitions, as will be described.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following regular intra predictive or inter predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs, for regular residual coding, may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m. For depth coding, the 3D-HEVC WD further supports SDC for residual data, where delta DC values represent residual values for PU partitions. Unlike regular HEVC residual values, delta DC residual values typically are not transformed or quantized.

Following quantization, video encoder 20 may scan the quantized transform coefficients, producing a one-dimensional vector from the two-dimensional matrix including the quantized transform coefficients. The scan may be designed to place higher energy (and therefore lower frequency)

coefficients at the front of the array and to place lower energy (and therefore higher frequency) coefficients at the back of the array.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive binary arithmetic coding (CABAC), as used in HEVC. Examples of other entropy coding processes include context-adaptive variable length coding (CAVLC), syntax-based context-adaptive binary arithmetic coding (SBAC), and Probability Interval Partitioning Entropy (PIPE) coding. Again, in HEVC, CABAC is used. Video encoder 20 may also entropy encode syntax elements associated with encoded video data for use by video decoder 30 in decoding video data.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video encoder 20 and/or video decoder 30 may perform intra-picture prediction coding of depth data and inter-prediction coding of depth data. In addition, in accordance with examples of this disclosure, video encoder 20 and/or video decoder 30 may use SDC to code DC residual data resulting from depth intra prediction coding of video data and/or depth inter prediction coding of video data, e.g., according to any of a variety of examples, as will be described.

In HEVC, assuming that the size of a coding unit (CU) is 2N×2N, video encoder 20 and video decoder 30 may support various prediction unit (PU) sizes of 2N×2N or N×N for intra-prediction, and symmetric PU sizes of 2N×2N, 2N×N, N×2N, N×N, or similar sizes for inter-prediction. A video encoder and video decoder may also support asymmetric partitioning for PU sizes of 2N×nU, 2N×nD, nL×2N, and nR×2N for inter-prediction. For depth coding as provided in 3D-HEVC, a video encoder and video decoder may be configured to support a variety of different depth coding modes for intra prediction and/or inter prediction, including various depth modeling modes (DMMs), as described in this disclosure.

Video data coded using 3D video coding techniques may be rendered and displayed to produce a three-dimensional effect. As one example, two images of different views (i.e., corresponding to two camera perspectives having slightly different horizontal positions) may be displayed substantially simultaneously such that one image is seen by a viewer's left eye, and the other image is seen by the viewer's right eye.

A 3D effect may be achieved using, for example, stereoscopic displays or autostereoscopic displays. Stereoscopic displays may be used in conjunction with eyewear that filters the two images accordingly. For example, passive glasses may filter the images using polarized lenses, or different colored lenses, or other optical filtering techniques, to ensure that the proper eye views the proper image. Active glasses, as another example, may rapidly shutter alternate lenses in coordination with the stereoscopic display, which may alternate between displaying the left eye image and the right eye image. Autostereoscopic displays display the two images in such a way that no glasses are needed. For example, autostereoscopic displays may include mirrors or prisms that are configured to cause each image to be projected into a viewer's appropriate eyes.

The techniques of this disclosure relate to techniques for coding 3D video data by coding depth data to support 3D video. In general, the term "texture" is used to describe luminance (that is, brightness or "luma") values of an image and chrominance (that is, color or "chroma") values of the image. In some examples, a texture image may include one set of luminance data (Y) and two sets of chrominance data for blue hues (Cb) and red hues (Cr). In certain chroma formats, such as 4:2:2 or 4:2:0, the chroma data is downsampled relative to the luma data. That is, the spatial resolution of chrominance pixels may be lower than the spatial resolution of corresponding luminance pixels, e.g., one-half or one-quarter of the luminance resolution.

Depth data generally describes depth values for corresponding texture data. For example, a depth image may include a set of depth pixels (or depth values) that each describes depth, e.g., in a depth component of a view, for corresponding texture data, e.g., in a texture component of the view. Each pixel may have one or more texture values (e.g., luminance and chrominance), and may also have one or more depth values. A texture picture and a depth map may, but need not, have the same spatial resolution. For instance, the depth map may include more or fewer pixels than the corresponding texture picture. The depth data may be used to determine horizontal disparity for the corresponding texture data, and in some cases, vertical disparity may also be used.

A device that receives the texture and depth data may display a first texture image for one view (e.g., a left eye view) and use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in the right view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change.

Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur, to slight perception of depth, or may be displayed in different locations for the left and right eye (e.g., with horizontal disparity that is opposite that of pixels located in front of the zero disparity plane). Many other techniques may also be used to convey or define depth data for an image.

Two-dimensional video data is generally coded as a sequence of discrete pictures, each of which corresponds to a particular temporal instance. That is, each picture has an associated playback time relative to playback times of other images in the sequence. These pictures may be considered texture pictures or texture images. In depth-based 3D video coding, each texture picture in a sequence may also correspond to a depth map. That is, a depth map corresponding to a texture picture describes depth data for the corresponding texture picture. Multiview video data may include data for various different views, where each view may include a respective sequence of texture components and corresponding depth components.

A picture generally corresponds to a particular temporal instance. Video data may be represented using a sequence of access units, where each access unit includes all data corresponding to a particular temporal instance. Thus, for example, for multiview video data plus depth coding, texture images from each view for a common temporal instance, plus the depth maps for each of the texture images, may all be included within a particular access unit. Hence, an access unit may include multiple views, where each view may include data for a texture component, corresponding to a texture image, and data for a depth component, corresponding to a depth map.

Each access unit may contain multiple view components or pictures. The view components for a particular view are associated with a unique view id or view order index, such that view components of different views are associated with different view ids or view order indices. A view component may include a texture view component as well as a depth view component. The texture and depth view components in the same view may have different layer ids. A texture view component may be coded as one or more texture slices, while the depth view component may be coded as one or more depth slices. Multiview-plus-depth creates a variety of coding possibilities, such as intra-picture, inter-picture, intra-view, inter-view, motion prediction, and the like.

In this manner, 3D video data may be represented using a multiview video plus depth format, in which captured or generated views include texture components associated with corresponding depth maps. Moreover, in 3D video coding, textures and depth maps may be coded and multiplexed into a 3D video bitstream. Depth maps may be coded as gray-scale images, where "luma" samples (that is, pixels) of the depth maps represent depth values.

In general, a block of depth data (a block of samples of a depth map, e.g., corresponding to pixels) may be referred to as a depth block. A depth value may be referred to as a luma value associated with a depth sample. That is, a depth map may generally be treated as a monochrome texture picture, i.e., a texture picture including luminance values and no chrominance values. In any case, conventional intra- and inter-coding methods may be applied for depth map coding. Alternatively, or additionally, other coding methods such as intra SDC or inter SDC may be applied for depth map coding in a 3D video coding process, such as 3D-HEVC.

In 3D-HEVC, the same definition of intra prediction modes is utilized as in HEVC. That is, the intra modes used in 3D-HEVC include the intra modes of HEVC. Also, in 3D-HEVC, Depth Modeling Modes (DMMs) are introduced together with the HEVC intra prediction modes to code an Intra prediction unit of a depth slice.

For better representations of sharp edges in depth maps, the current HTM (3D-HTM version 9.0) applies a DMM method for intra coding of the depth map. A depth block is partitioned into two regions specified by a DMM pattern, where each region is represented by a constant value. The DMM pattern can be either explicitly signaled (DMM mode 1), or predicted by a co-located texture block (DMM mode 4).

Figure 4:
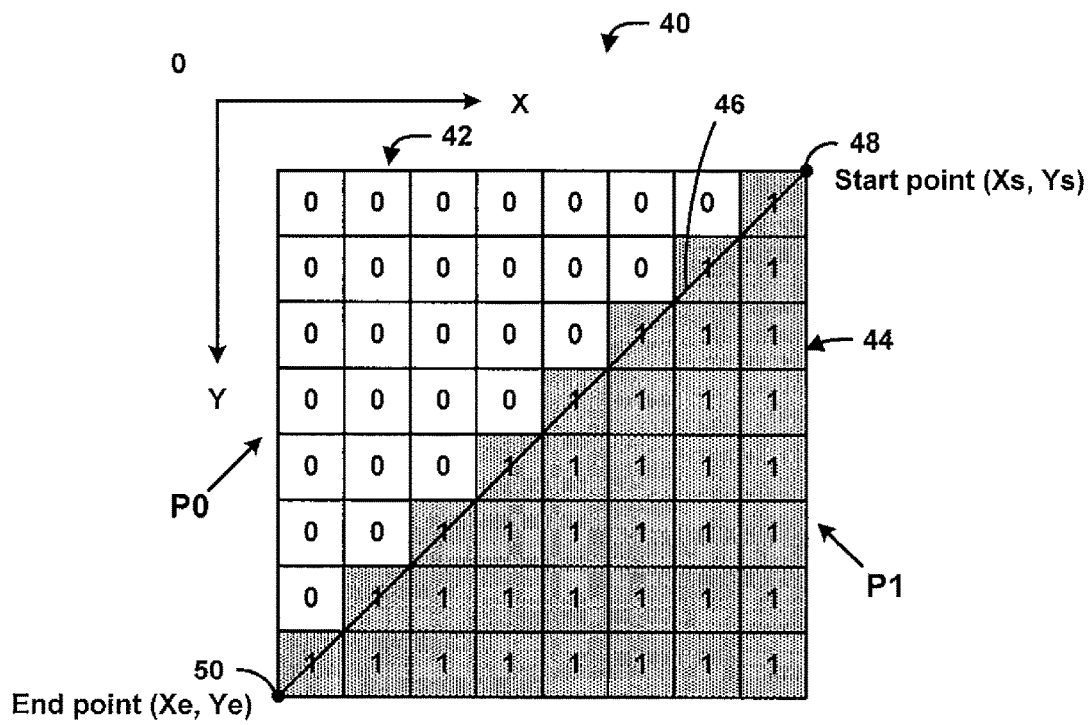
FIG. 4 is a diagram illustrating an example of one wedgelet partition pattern for use in coding an 8×8 block of pixel samples.
Figure 5:
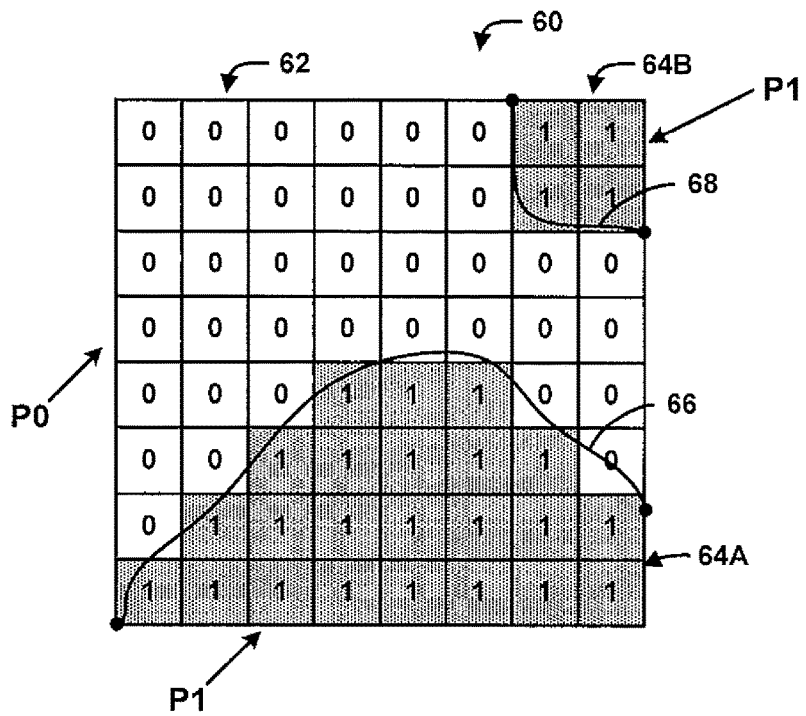
FIG. 5 is a diagram illustrating an example of one contour partition pattern for use in coding an 8×8 block of pixel samples.

There are two types of partitioning models defined in DMM, including Wedgelet partitioning and the Contour partitioning. FIG. 4 is a diagram illustrating an example of a Wedgelet partition pattern for use in coding a block of pixel samples. FIG. 5 is a diagram illustrating an example of a contour partition pattern for use in coding a block of pixel samples. For a Wedgelet partition, as shown in FIG. 4, a depth block such as a PU is partitioned into two regions by a straight line, where the two regions are labeled with P0 and P1. For Contour partitioning, as shown in FIG. 5, a depth block such as a PU can be partitioned into two irregular regions. Hence, a PU may include a single partition, or in the case of wedgelet partitioning or contour partitioning, may include two partitions.

Contour partitioning is more flexible than the Wedgelet partitioning, but difficult to be explicitly signaled. In DMM mode 4, the contour partitioning pattern is implicitly derived using reconstructed luma samples of the co-located texture block.

As one example, FIG. 4 provides an illustration of a Wedgelet pattern for an 8×8 block 40. For a Wedgelet partition, a depth block, e.g., PU, is partitioned into two regions 42, 44 by a straight line 46, with a start point 48 located at (Xs, Ys) and an end point 50 located at (Xe, Ye), as illustrated in FIG. 4, where the two regions 42, 44 are also labeled with P0 and P1, respectively. Each pattern in block 40 consists of an array of size uB×vB binary digit labeling whether the corresponding sample belongs to region P0 or P1 where uB and vB represents the horizontal and vertical size of the current PU respectively. The regions P0 and P1 are represented in FIG. 4 by white and shaded samples, respectively.

As shown in the example of FIG. 5, a depth block, such as depth block 60, can be partitioned into three irregularly-shaped regions 62, 64A and 64B, using contour partitioning, where region 62 is labeled as P0 and the two regions 64A and 64B are co-labeled as P1, respectively. Although pixels in region 64A are not immediately adjacent to pixels in region 64B, regions 64A and 64B may be defined to form one single region, for the purposes of predicting a PU of depth block 60. In DMM mode 4, in the case of 3D-HEVC, the contour partitioning pattern is implicitly derived using reconstructed luma samples of the co-located texture block.

With reference to FIGS. 4 and 5, each individual square within N×N depth blocks 40 and 60 represents a respective individual pixel of depth blocks 40 and 60, respectively. In FIG. 4, numeric values within the squares represent whether the corresponding pixel belongs to region 42 (value "0" in the example of FIG. 4) or region 44 (value "1" in the example of FIG. 4). Shading is also used in FIG. 4 to indicate whether a pixel belongs to region 42 (white squares) or region 44 (grey shaded squares).

As discussed above, each pattern (that is, both Wedgelet and Contour) may be defined by an array of size uB×vB binary digit labeling of whether the corresponding sample (that is, pixel) belongs to region P0 or P1 (where P0 corresponds to region 42 in FIG. 4 and region 62 in FIG. 5, and P1 corresponds to region 44 in FIG. 4 and regions 64A, 64B in FIG. 5), where uB and vB represent the horizontal and vertical size of the current PU, respectively. In the examples of FIG. 4 and FIG. 5, the PU corresponds to blocks 40 and 60, respectively. Video coders, such as video encoder 20 and video decoder 30, may initialize Wedgelet patterns at the beginning of coding, e.g., the beginning of encoding or the beginning of decoding.

For HEVC intra prediction modes, a pixel specific intra predictor value is generated for each pixel in the PU by using neighboring samples of the PU, as specified in sub-clause 8.4.2 in HEVC WD 10.

For other depth intra modes, a partition specific DC predictor is calculated for each partition within the PU by using up to two neighboring samples of the PU. Let bPattern [x] [y] be the partition pattern of the PU, where x=0 . . . N−1, y=0 . . . N−1 and N is the width of the PU. bPattern[x] [y] indicates which partition pixel (x, y) belongs to and bPattern [x] [y] can be equal to 0 or 1. Let BitDepth be the bit depth of depth samples and let RecSample[x] [y] be the reconstructed neighboring samples of the PU, with x=−1 and y=0 . . . N−1 (corresponds to left neighboring pixels of the PU) or y=−1, x=0 . . . N−1 (corresponds to above neighboring pixels of the PU). Then, DC predictor of partition X, namely DCPred[X], with X=0 or 1 is derived as follows:

Set bT=(bPattern[0][0] !=bPattern[N−1][0]) ? 1:0
Set bL=(bPattern[0][0] !=bPattern[0] [N−1])? 1:0
If bT equals bL
   DCPred[X]=(RecSample[−1][0]+RecSample[0] [−1])>>1
   DCPred[1−X]=bL ?(RecSample[−1][N−1]+RecSample[N−1][−1])>>1:$2^{BitDepth-1}$
Otherwise
   DCPred[X]=bL ?RecSample[(N−1)>>1][−1]: RecSample[−1][(N−1)>>1]
   DCPred[1−X]=bL ?RecSample[−1][N−1]: RecSample[N−1][−1]

A Depth Lookup Table (DLT) maps depth indexes to depth values. The DLT can be constructed by analyzing the frames within the first intra period before encoding the full video sequence. In the current design of 3D-HEVC, all of the valid depth values are sorted in ascending order and inserted to the DLT with increasing indexes.

DLT is an optional coding tool. In the current HTM (3D-HTM version 9.0), encoder 20 will not use DLT if more than half of the values from 0 to MAX_DEPTH_VALUE (e.g., 255 for 8-bit depth samples) appear in the original depth map at the analysis step. Otherwise, the DLT will be coded in a sequence parameter set (SPS) and/or video parameter set (VPS). In order for encoder 20 to code DLT, the number of valid depth values is coded with Exp-Golomb code first. Then, each valid depth value is also coded with an Exp-Golomb code.

Video encoder 20 reads a pre-defined number of frames from the input video sequence to be coded and scans all samples for available depth map values. During this process, encoder 20 generates a mapping table that maps depth values to valid depth values based on the original uncompressed depth map.

Encoder 20 and/or decoder 30 derive the Depth Lookup Table Idx2Depth(.), the Index Lookup TableDepth2Idx(.), the Depth Mapping Table M(.) and the number of valid depth values $d_{valid}$ using the following algorithm that analyzes the depth map $D_t$:

1. Initialization
   boolean vector B(d) = FALSE for all depth values d
   index counter i = 0
2. Process each pixel position p in $D_t$ for multiple time instances t:
   Set (B($D_t$(p)) = TRUE to mark valid depth values
3. Count number of TRUE values in B(d) → $d_{valid}$ -continued 4. For each d with B(d) = = TRUE:
   Set Idx2Depth(i) = d
   Set M(d) = d
   Set Depth2Idx(d) = i
   i = i + 1
5. For each d with B(d) = = FALSE:
   Find d'= arg min |d − d'| and B(d') = = TRUE
   Set M(d) = d'
   Set Depth2Idx(d) = Depth2Idx(d').

Mapping from an index Idx back to a depth value d is as follows: d=Idx2Depth [Idx]. Mapping from a depth value d to an index Idx is as follows: Idx=Depth2Idx [d].

Intra SDC mode (i.e., intra segment-wise DC coding, which also may be referred to as intra simplified depth coding) has been introduced in 3D-HEVC together with the HEVC intra prediction modes, DMM modes and chain coding mode to code an intra PU of a depth slice. In the current 3D-HEVC, SDC is only applied for a 2N×2N PU partition size. Instead of coding quantized transform coefficients, SDC modes represent a depth block with the following two types of information:

1. The type of partition of the current depth block, including:
   a. DMM mode 1 (2 partitions)
   b. Planar (1 partition)
2. For each partition, a residual value (in the pixel domain) is signaled in the bitstream.

Two sub-modes are defined in SDC, including SDC mode 1 and SDC mode 2, which correspond to the partition type of Planar and DMM mode 1, respectively. The DC residual value may be represented as a delta DC value indicating a difference in a DC value of a depth PU partition and the DC value of a predicted partition for the depth PU partition. Again, the DC value may be an average pixel value of the depth pixel samples in the depth PU partition.

Simplified residual coding is used in intra SDC. In simplified residual coding, as described above, one DC residual value is signaled for each partition of the PU, and no transform or quantization is applied. To signal the information representing the DC residual value of each partition, as discussed above, two methods can be applied:

1. Directly code the DC residual value of each partition which is calculated by subtracting the predictor, denoted by Pred, generated by neighboring samples from the DC value (i.e., average value, denoted by Aver) of the current partition in the current PU.
2. When DLTs are transmitted, instead of coding the DC residual value, the index difference of the Aver and Pred mapped from the Index Lookup Table is coded. The index difference is calculated by subtracting the index of Pred from the index of Aver. At the decoder side, the sum of decoded index difference and the index of Pred is mapped back to depth values based on the DLT.

In JCT3V-F0126, it was proposed that, in depth coding, intra SDC can be applied for all the additional depth Intra prediction modes and the original HEVC Intra prediction modes. In particular, the basic idea of SDC is extended to various intra prediction modes used in video encoder 20 and video decoder 30. In SDC, video encoder 20 or video decoder 30 codes only one DC residual value, i.e., a delta DC value, for a depth PU or PU partition coded in intra prediction mode. Transform and quantization are skipped, and no additional residual transform tree is required for the depth coding unit (CU). Hence, SDC provides an alternative residual coding method by which encoder 20 only encodes and/or video decoder 30 only decodes one DC residual value for a depth PU or partition in intra mode.

Figure 6:
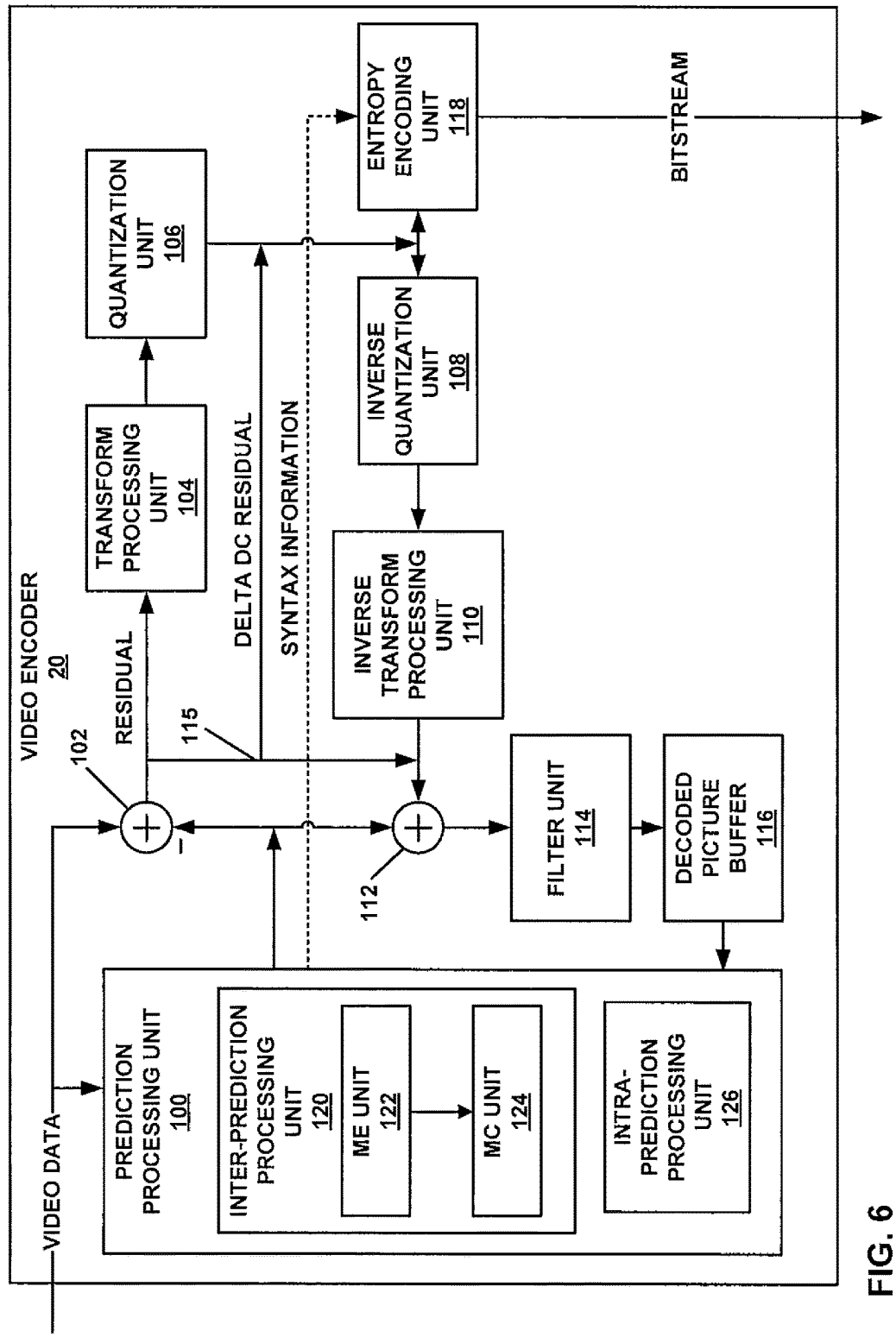
FIG. 6 is a block diagram illustrating an example video encoder that may implement the techniques of this disclosure.

FIG. 6 is a block diagram illustrating an example video encoder 20 that may be configured to implement the techniques of this disclosure, such as techniques for simplifying segment-wise DC coding (SDC) for large intra-prediction blocks, such as 64×64 blocks, in a 3D video coding process, such as 3D-HEVC. In some examples, video encoder 20 may be configured to process large 64×64 intra-prediction blocks, e.g., 64×64 intra-prediction blocks, as four smaller intra-prediction blocks, e.g., four 32×32 intra-prediction blocks, in intra SDC. In this manner, in intra SDC, 64×64 intra prediction block of HEVC intra prediction modes is processed as four 32×32 intra prediction blocks. In some cases, processing large intra-prediction blocks as multiple, smaller intra-prediction blocks in intra SDC may reduce maximum buffer size requirements in the intra SDC process for encoder 20.

This disclosure describes video encoder 20 in the context of HEVC coding and, more particularly, 3D-HEVC coding, e.g., as described in 3D-HEVC WD and as further modified as described in this disclosure. However, the techniques of this disclosure may be applicable to other coding standards or methods in which an intra SDC mode is used for depth coding. Accordingly, FIG. 6 is provided for purposes of explanation and should not be considered limiting of the techniques as broadly exemplified and described in this disclosure.

In the example of FIG. 6, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation (ME) unit 122 and a motion compensation (MC) unit 124.

The components of prediction processing unit 100 are described as performing both texture encoding and depth encoding. In some examples, texture and depth encoding may be performed by the same components of prediction processing unit 100 or different components within prediction processing unit 100. For example, separate texture and depth encoders may be provided in some implementations. Also, multiple texture and depth encoders may be provided to encode multiple views, e.g., for multiview plus depth coding. Video encoder 20 may include more, fewer, or different functional components than shown in FIG. 6.

In either case, prediction processing unit 100 may be configured to intra- or inter-encode texture data and depth data as part of a 3D coding process, such as a 3D-HEVC process. In particular, in some modes, prediction processing unit 100 may use regular, non-SDC residual coding or SDC coding. In the case of SDC coding, prediction processing unit 100 may generate a delta DC residual value for an intra- or inter-coded depth PU, wherein the delta DC residual value represents a difference between an average value of pixels in a PU or partition of the coded PU and an average value of predicted samples in an intra- or inter-predicted PU partition. A PU may have a single partition or multiple partitions, depending on the coding mode. HEVC intra, HEVC inter modes, DMM's or other modes may be used to code a depth PU.

In some examples, prediction processing unit 100 may operate substantially in accordance with 3D-HEVC, e.g., as described in the 3D-HEVC WD, subject to modifications and/or additions described in this disclosure, such as those relating to simplifying segment-wise DC coding (SDC) for large intra-prediction blocks, for example, by processing a 64×64 intra-prediction block as four smaller intra-prediction 64×64 blocks, in intra SDC mode. In this manner, in intra SDC, 64×64 intra prediction of HEVC intra prediction modes is processed as four 32×32 intra prediction. Prediction processing unit 100 may provide syntax information to entropy encoding unit 118. The syntax information may indicate, for example, which prediction modes were used and information relating to such modes.

Video encoder 20 receives video data to be encoded. Video encoder 20 may encode each of a plurality of coding tree units (CTU) in a slice of a picture of the video data. Each of the CTUs may be associated with equally-sized luma coding tree blocks (CTBs) and corresponding chroma CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTB to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks.

Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction. In accordance with aspects of this disclosure, video encoder 20 and video decoder 30 also support non-rectangular partitions of a PU for depth inter coding.

Inter-prediction processing unit 120 may generate predictive data for a PU by performing inter prediction on each PU of a CU. The predictive data for the PU may include predictive sample blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, motion estimation (ME) unit 122 may search the reference pictures in a list of reference pictures (e.g., "RefPicList0") for a reference region for the PU. The reference pictures may be stored in decoded picture buffer 116. The reference region for the PU may be a region, within a reference picture, that contains sample blocks that most closely corresponds to the sample blocks of the PU. Motion estimation (ME) unit 122 may generate a reference index that indicates a position in RefPicList0 of the reference picture containing the reference region for the PU.

In addition, for inter-coding, motion estimation (ME) unit 122 may generate a motion vector (MV) that indicates a spatial displacement between a coding block of the PU and a reference location associated with the reference region. For instance, the MV may be a two-dimensional vector that provides an offset from the coordinates in the current decoded picture to coordinates in a reference picture. Motion estimation (ME) unit 122 may output the reference index and the MV as the motion information of the PU. Motion compensation (MC) unit 124 may generate the predictive sample blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation (ME) unit 122 may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. Motion compensation (MC) unit 124 may generate the predictive sample blocks of the PU based at least in part on actual or interpolated samples at the reference region indicated by the motion vector of the PU.

To perform bi-directional inter-prediction for a PU, motion estimation unit 122 may search the reference pictures in RefPicList0 for a reference region for the PU and may also search the reference pictures in RefPicList1 for another reference region for the PU. Motion estimation (ME) unit 122 may generate reference picture indexes that indicate positions in RefPicList0 and RefPicList1 of the reference pictures that contain the reference regions. In addition, motion estimation (ME) unit 122 may generate MVs that indicate spatial displacements between the reference location associated with the reference regions and a sample block of the PU. The motion information of the PU may include the reference indexes and the MVs of the PU. Motion compensation (MC) unit 124 may generate the predictive sample blocks of the PU based at least in part on actual or interpolated samples at the reference region indicated by the motion vector of the PU.

Intra-prediction processing unit 126 may generate predictive data for a PU by performing intra prediction on the PU. The intra-predictive data for the PU may include predictive sample blocks for the PU and various syntax elements. Intra-prediction processing unit 126 may perform intra prediction on PUs in I slices, P slices, and B slices. To perform intra prediction on a PU, intra-prediction processing unit 126 may use multiple intra prediction modes to generate multiple sets of predictive data for the PU, and then select one of the intra-prediction modes that yields acceptable or optimal coding performance, e.g., using rate-distortion optimization techniques.

To use an intra prediction mode to generate a set of predictive data for the PU, intra-prediction processing unit 126 may extend samples from sample blocks of spatially neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the luma, Cb and Cr coding block of a CU and the selected inter- or intra-predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample, i.e., in luma or chroma pixel value, as applicable, in a corresponding selected predictive sample block of a PU of the CU. Residual generation unit 102 also may generated delta DC residual values for SDC modes.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

For regular residual coding, transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block. Again, for SDC coding, transformation and quantization typically are not applied to the delta DC residual value generated for a predicted PU or partition.

Quantization unit 106 may, for regular residual coding, quantize the residual transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

For HEVC intra modes, HEVC inter modes and other modes, such as DMM modes, SDC residual coding for depth CU's may be used to generate a delta DC residual value, also referred to as a DC residual value, for a predicted PU or PU partition. For SDC, residual generation unit 102 may generate a single delta DC value for each depth PU or PU partition, where the single delta DC value represents a difference between an average value of pixels in the PU or PU partition, and an average value of predicted samples in an intra- or inter-predicted PU or PU partition. The delta DC residual value is not transformed or quantized and may be provided by residual generation unit 102 to entropy coding unit 118 as indicated by line 115 in FIG. 6.

Reconstruction unit 112 may reconstruct a depth CU based on DC residual values for partitions of PU's of the CU and corresponding predicted partitions of the PU's of the CU. For example, the delta DC residual value for each depth PU partition may be added to the pixel values in a corresponding predicted partition to reconstruct the depth PU partition, wherein the DC residual value may represent a difference between an average value of the pixels of the depth PU partition and the average value of the predicted samples of the predicted partition. In some examples, information representing the DC residual value, such as one or more syntax elements representing delta DC values, may be generated by prediction processing unit 100, received by entropy encoding unit 118, and used by reconstruction unit 112 without inverse quantization or inverse transform processing, e.g., as indicated by line 115.

Filter unit 114 may perform one or more filtering operations to reduce artifacts, such as blocking artifacts, in the coding blocks associated with a reconstructed CU. The filtering operations may include one or more of: deblocking to remove blockiness at block boundaries, loop filtering to smooth pixel transitions, sample adaptive offset filtering to smooth pixel transitions, or possibly other types of filtering operations or techniques. Decoded picture buffer 116 may store the reconstructed coding blocks after filter unit 114 performs the one or more deblocking operations on the reconstructed coding blocks. Inter-prediction unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from various functional components of video encoder 20. For example, entropy encoding unit 118 may receive coefficient blocks from quantization unit 106 and may receive syntax elements from prediction processing unit 100. In addition, entropy encoding unit 118 may receive delta DC residual values from residual generation unit 102. Entropy encoding unit 118 may perform one or more entropy encoding operations on the data to generate entropy-encoded data. For example, entropy encoding unit 118 may perform a CABAC operation. Examples of other entropy coding processes include context-adaptive variable length coding (CAVLC), syntax-based context-adaptive binary arithmetic coding (SBAC), and Probability Interval Partitioning Entropy (PIPE) coding. In HEVC, CABAC is used. Video encoder 20 may output a bitstream that includes entropy-encoded data generated by entropy encoding unit 118. For instance, the bitstream may include bits that represent bins of binary syntax elements or binarized syntax elements.

Video encoder 20 is an example of a video encoder configured to perform any of the techniques described in this disclosure, including techniques for simplified segment-wise DC coding of large prediction blocks. Additional 3D processing components may also be included within video encoder 20. In accordance with one or more techniques of this disclosure, one or more units within video encoder 20 may perform the techniques described herein as part of a video encoding process. Similarly, video encoder 20 may perform a video decoding process using any of the techniques of this disclosure, to reconstruct video data used as reference data for prediction of subsequently coded video data.

Figure 7:
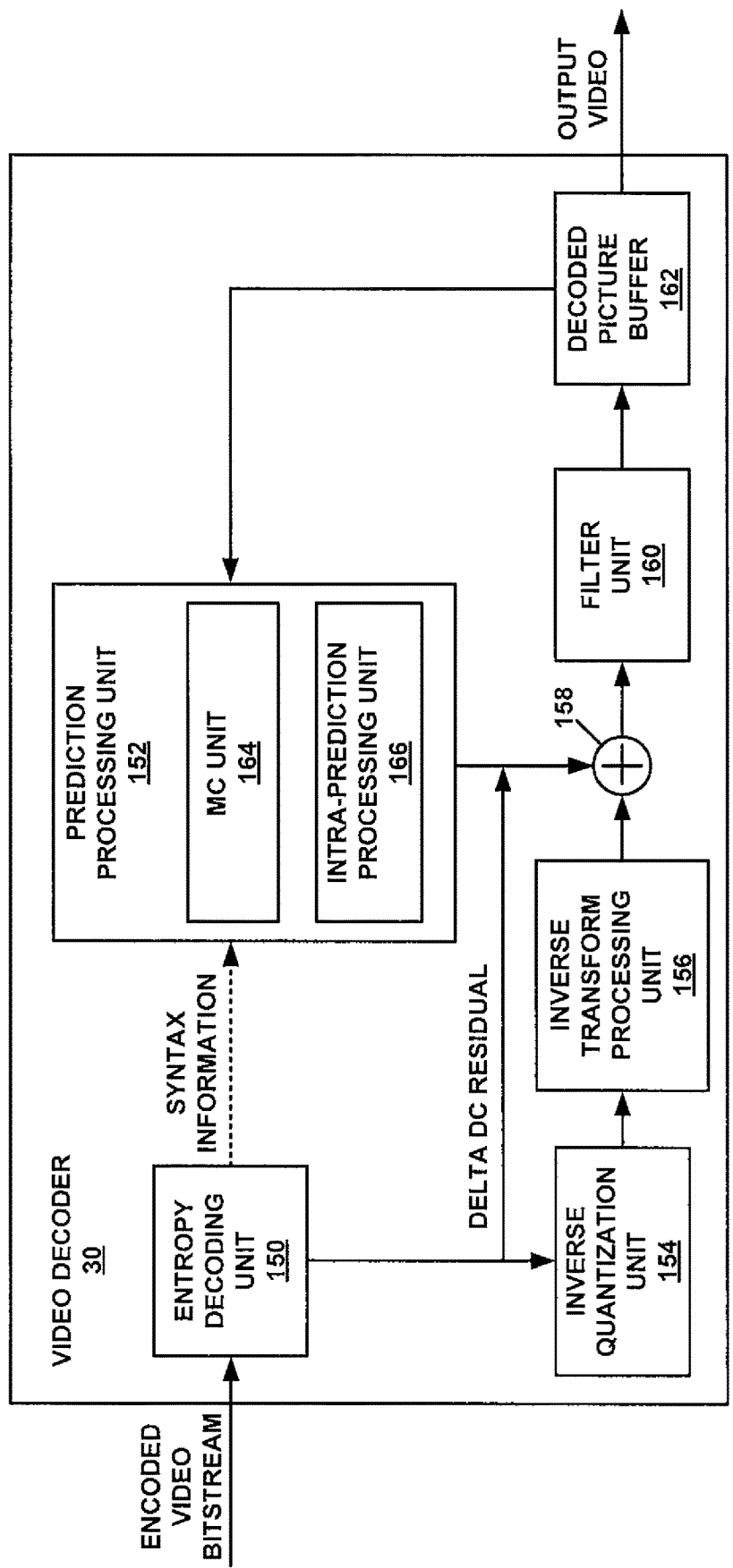
FIG. 7 is a block diagram illustrating an example video decoder that may implement the techniques of this disclosure.

FIG. 7 is a block diagram illustrating an example video decoder 30 that is configured to perform the techniques of this disclosure. FIG. 7 is provided for purposes of illustration and should not be considered limiting of the techniques as broadly exemplified and described in this disclosure. This disclosure describes video decoder 30 in the context of HEVC coding and, in particular, 3D-HEVC coding. However, the techniques of this disclosure may be applicable to other 3D video coding standards or methods. Video decoder 30 may be configured to perform techniques for simplifying segment-wise DC coding (SDC) for large intra-prediction blocks, such as 64×64 blocks, in a 3D video coding process, such as 3D-HEVC. In some examples, video decoder 30 may be configured to process large 64×64 intra-prediction blocks, e.g., 64×64 intra-prediction blocks, as four smaller intra-prediction blocks, e.g., four 32×32 intra-prediction blocks, in intra SDC. In this manner, in intra SDC depth coding, 64×64 intra prediction of HEVC intra prediction modes is processed as four 32×32 intra prediction. In some cases, processing large intra-prediction blocks as multiple, smaller intra-prediction blocks in intra SDC may reduce maximum buffer size requirements in the intra SDC process for encoder 30.

In the example of FIG. 7, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation (MC) unit 164 for inter-prediction and an intra-prediction processing unit 166. For ease of illustration, the components of prediction processing unit 152 are described as performing both texture decoding and depth decoding. In some examples, texture and depth decoding may be performed by the same components of prediction processing unit 152 or different components within prediction processing unit 152. For example, separate texture and depth decoders may be provided in some implementations. Also, multiple texture and depth decoders may be provided to decode multiple views, e.g., for multiview plus depth coding. In either case, prediction processing unit 152 may be configured to intra- or inter-decode texture data and depth data as part of a 3D coding process, such as a 3D-HEVC process.

Accordingly, prediction processing unit 152 may operate substantially in accordance with 3D-HEVC, subject to modifications and/or additions described in this disclosure, such as those relating to techniques for simplifying segment-wise DC coding (SDC) for large intra-prediction blocks, such as techniques for processing large 64×64 intra-prediction blocks, e.g., 64×64 intra-prediction blocks, as four smaller intra-prediction blocks, e.g., four 32×32 intra-prediction blocks, in intra SDC. Prediction processing unit 152 may obtain residual data from the encoded video bitstream for intra-decoded or inter-decoded depth data using SDC or regular, non-SDC residual coding techniques, via entropy decoding unit 150, and reconstruct CU's using intra-predicted or inter-predicted depth data and the residual data. The residual data may be delta DC residual values when SDC is used. In some examples, video decoder 30 may include more, fewer, or different functional components than shown in FIG. 7.

Video decoder 30 receives an encoded video bitstream. Entropy decoding unit 150 parses the bitstream to decode entropy-encoded syntax elements from the bitstream. In some examples, for SDC, entropy decoding unit 118 may be configured to use a CABAC coder to decode, from bits in the bitstream, bins for a syntax element representing a delta DC residual value. Entropy decoding unit 118 may use the CABAC coder to decode a variety of other syntax elements for different coding modes, including intra- or inter-coding modes with regular residual coding and intra- or inter-SDC modes with delta DC residual coding.

Prediction processing unit 152, inverse quantization unit 154, inverse transform processing unit 156, reconstruction unit 158, and filter unit 160 may generate decoded video data based on the syntax elements extracted from the bitstream. The bitstream may comprise a series of NAL units. The NAL units of the bitstream may include coded slice NAL units. As part of decoding the bitstream, entropy decoding unit 150 may extract and entropy decode syntax elements from the coded slice NAL units.

Each of the coded slices may include a slice header and slice data. The slice header may contain syntax elements pertaining to a slice. The syntax elements in the slice header may include a syntax element that identifies a PPS associated with a picture that contains the slice. The PPS may refer to an SPS, which may in turn refer to a VPS. Entropy decoding unit 150 may also entropy decode other elements that may include syntax information, such as SEI messages. Decoded syntax elements in any of the slice header, parameter sets, or SEI messages may include information described herein as being signaled in accordance with example techniques described in this disclosure. Such syntax information may be provided to prediction processing unit 152 for decoding and reconstruction of texture or depth blocks.

Video decoder 30 may perform a reconstruction operation on non-partitioned CU's and PUs. To perform the reconstruction operation, for non-SDC coding, video decoder 30 may perform a reconstruction operation on each TU of the CU. By performing the reconstruction operation for each TU of the CU, video decoder 30 may reconstruct blocks of the CU. As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra-prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

If a PU is encoded using inter-prediction, MC unit 164 may perform intra prediction to generate an inter-predictive block for the PU. MC unit 164 may use an inter prediction mode to generate the predictive luma, Cb and Cr blocks for the PU based on the prediction blocks of PUs in other pictures or views. MC unit 164 may determine the inter prediction mode for the PU based on one or more syntax elements decoded from the bitstream, and may receive motion information such as motion vectors, prediction direction, and reference picture indexes.

For inter-prediction, MC unit 164 may construct a first reference picture list (RefPicList0) and a second reference picture list (RefPicList1) based on syntax elements extracted from the bitstream. If a PU is encoded using inter prediction, entropy decoding unit 150 may extract motion information for the PU. MC unit 164 may determine, based on the motion information of the PU, one or more reference blocks for the PU. Motion compensation (MC) unit 164 may generate, based on samples in blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add residual samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 3. For instance, video decoder 30 may perform, based on the luma, Cb and Cr blocks in decoded picture buffer 162, intra prediction or inter prediction operations on PUs of other CUs.

Video decoder 30 is an example of a video decoder configured to perform any of the techniques described in this disclosure, including techniques for simplified segment-wise DC coding of large prediction blocks. In accordance with one or more techniques of this disclosure, one or more units within video decoder 30 may perform one or more techniques described herein as part of a video decoding process. Additional 3D coding components may also be included within video decoder 30.

Prediction processing unit 152 and, more particularly, intra-prediction processing unit 166 and motion compensation (MC) unit 164, may determine whether to perform SDC in depth intra-prediction modes and depth inter-prediction modes, as applicable, of a 3D video coding process, such as 3D-HEVC. When SDC is used, entropy decoding unit 150 may entropy decode one or more delta DC residual values for PU's or PU partitions of a depth CU, as well as associated syntax information.

For SDC, entropy decoding unit 150 may provide SDC syntax information for the block to prediction processing unit 152, as indicated in FIG. 7. Entropy decoding unit 150 may provide delta DC residual values to reconstruction unit 158. The delta DC residual values received by video decoder 30 may be not be transformed and quantized. In particular, the delta DC residual value(s) need not be first provided to inverse quantization unit 154 and inverse transform processing unit 156 for inverse quantization and inverse transformation. Instead, entropy decoding unit 150 may decode, from bits in the bitstream, bins for one or more syntax elements representing a delta DC residual value, and provide information representing the delta DC residual value to reconstruction unit 158 for use in reconstructing an SDC coded PU or partition. Reconstruction unit 158 may receive an intra- or inter-predicted PU or PU partition of a depth CU from prediction processing unit 152 and add the delta DC residual value to each of the samples of the predicted PU or PU partition to reconstruct the coded PU or PU partition.

In this manner, when SDC is used, reconstruction unit 158 may reconstruct a depth CU based on delta DC residual values for partitions of PU's of the CU and corresponding predicted PUs or PU partitions of the CU. Again, the delta DC residual value may represent a difference between an average value of the pixels of the depth PU or PU partition and the average value of the samples of the predicted PU or PU partition. As will be described, when syntax information indicates an intra SDC 64×64 mode, decoder 30 processes the 64×64 mode as four 32×32 modes.

In the HEVC main profile, the largest intra prediction size is 32×32. However, in the intra SDC mode of 3D-HEVC, the largest intra prediction size of Planar mode is 64×64. With the proposal in JCT3V-F0126, SDC can be applied for the additional depth Intra prediction modes and original HEVC Intra prediction modes. Accordingly, with this proposal, the largest intra prediction size of all HEVC intra prediction modes is 64×64. When compared with HEVC, both 3D-HEVC and the proposal in JCT3V-F0126 increase the maximum buffer size used for intra prediction.

In accordance with an example of this disclosure, to simplify SDC coding of large intra-prediction blocks, video encoder 20 and video decoder 30 may be configured to process a large intra-prediction block as four smaller intra-blocks. In the case of a 64×64 intra prediction block, for example, video encoder 20 and video decoder 30 may be configured to process the 64×64 intra-prediction block as four 32×32 intra-prediction blocks. In this manner, in SDC, 64×64 intra prediction of HEVC intra prediction modes is processed as four 32×32 intra prediction. The indications of 64×64 and 32×32 refer to the number of pixels in a depth PU or partition to be intra-coded using SDC, or a corresponding number of prediction samples in an intra-predicted depth PU or partition. Various aspects of techniques for processing a 64×64 intra prediction block as four 32×32 intra prediction blocks are described below for purposes of example.

Figure 8:
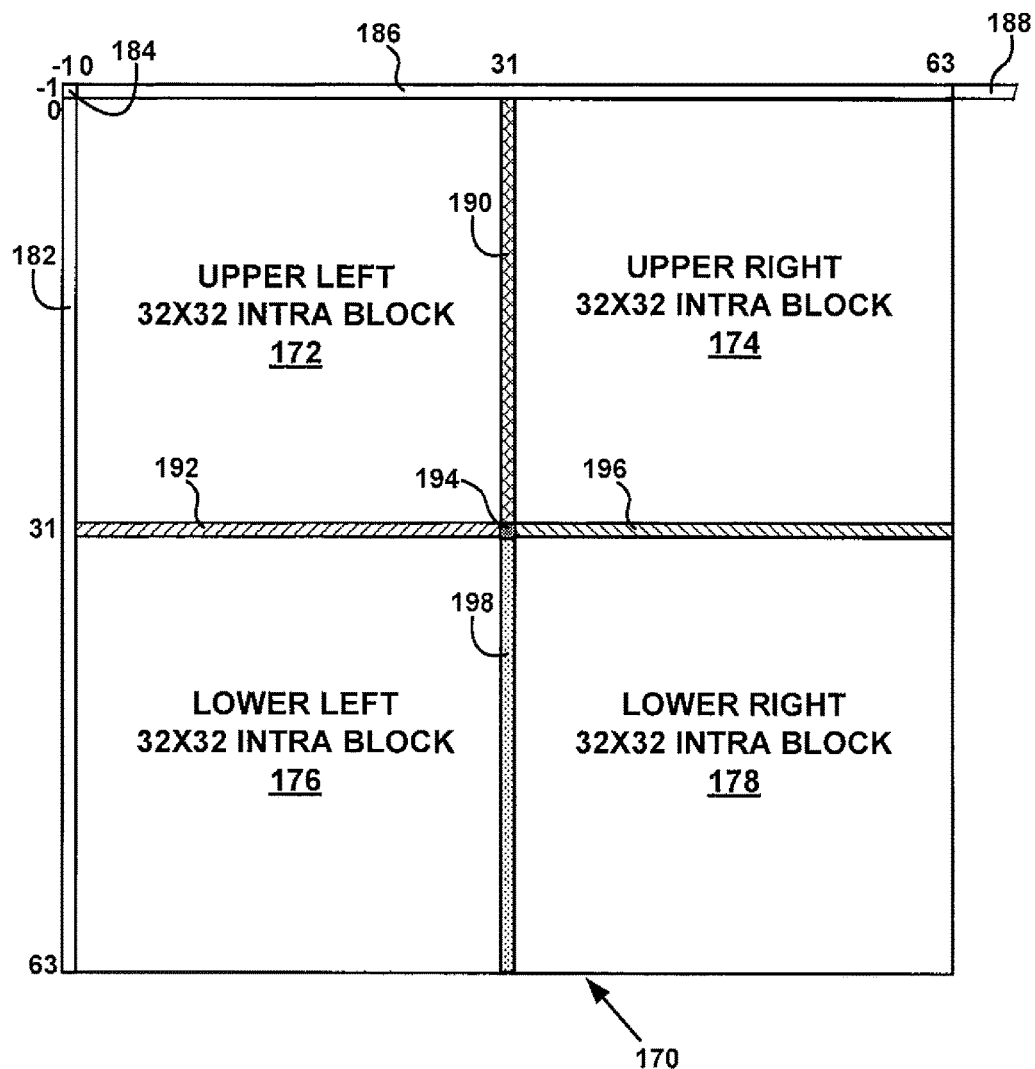
FIG. 8 is a diagram illustrating processing of a 64×64 intra-prediction block as four smaller 32×32 intra-prediction blocks.

FIG. 8 is a diagram illustrating processing of a 64×64 SDC intra-prediction block as four smaller 32×32 intra-prediction blocks. As shown in FIG. 8, a 64×64 depth block 170 is split into four 32×32 sub-blocks 172, 174, 176 and 178. Each of sub-blocks 172, 174, 176, 178 may have the same intra mode. For example, an intra mode may be applied to block 170, and used for each of the four 32×32 sub-blocks 172, 174, 176, 178. Block 172 is the upper left 32×32 intra block of the 64×64 block, block 174 is the upper right 32×32 intra block of the 64×64 block, block 176 is the lower left 32×32 intra block of the 64×64 block, and block 178 is the lower right 32×32 intra block of the 64×64 block of depth data. In this example, the 64×64 block 170 extends horizontally from x=0 to x=63 and vertically from y=0 to y=63. Upper left 32×32 intra block 172 extends horizontally from x=0 to x=31 and vertically from y=0 to y=31, upper right left 32×32 intra block 172 extends horizontally from x=32 to x=63 and vertically from y=0 to y=31, lower left 32×32 intra block 172 extends horizontally from x=0 to x=31 and vertically from y=32 to y=63, and lower right 32×32 intra block 172 extends horizontally from x=32 to x=63 and vertically from y=32 to y=63.

As further shown in FIG. 8, spatially neighboring reconstructed samples RecSample[x] [y] for the 64×64 block are available for prediction of some intra modes of the 32×32 blocks, where x and y are the vertical and horizontal positions, respectively, of a reconstructed sample relative to the top-left sample of the 64×64 block 170 at x=0, y=0. For example, FIG. 8 shows reconstructed left neighboring samples 182, e.g., at i=−1 and from j=0 to 63, the above left neighboring sample 184, e.g., at i=−1, j=−1, above neighboring samples 186, e.g., at i=0 to 63, j=−1, and above right neighboring samples 188 (only a portion of which is shown in FIG. 8), e.g., at i=64 to 127, j=−1. Bottom left neighboring samples, at i=−1, j=64-127, are not generally available if 64×64 is the largest coding unit size used for both HEVC and 3D-HEVC, because the coding units usually are coded in raster scan order. Therefore, when coding a coding unit, a coding unit below it is not encoded yet and hence has not yet produced any available reconstructed samples.

The reconstructed neighboring samples 182-188 reside in adjacent blocks that spatially neighbor the 64×64 block 170. Neighboring samples 182-188 are assumed to be reconstructed in the sense that the blocks in which the neighboring samples 182, 184, 186, 188 reside have already been encoded or decoded, and reconstructed, before the 64×64 block 170 presently being encoded or decoded.

In examples of this disclosure, it is proposed that, in intra SDC coding, a 64×64 intra prediction block coded with HEVC intra prediction modes, as in the current 3D-HEVC and potentially as proposed in JCT3V-F0126, can be simplified by splitting the 64×64 Intra prediction into four 32×32 intra prediction blocks, e.g., as shown in FIG. 8. These four 32×32 intra prediction blocks may have the same intra-prediction mode, and may be intra-predicted in raster scan or decoding order by video encoder 20 and video decoder 30.

In a first example, predicted samples of each 32×32 block can be used, instead of at least some neighboring reconstructed samples, to predict succeeding 32×32 blocks within the 64×64 block, as explained below. Hence, for intra prediction of some 32×32 blocks of the 64×64 block, available reference samples may be reconstructed only, reconstructed or predicted depending on the mode, or predicted only. In general, reconstructed reference samples have been reconstructed, e.g., by summing predicted reference samples with residual values, whereas predicted reference samples typically have not been summed with residual values. In each case, the reconstructed or predicted samples used for intra-prediction of a 32×32 block may generally neighbor that 32×32 block. In a second example, only reconstructed samples are used for intra-prediction of the 32×32 blocks of the 64×64 block, including for some 32×32 blocks, reconstructed samples that neighbor the 64×64 block, in that they are adjacent to the boundary of the 64×64 block, but do not neighbor the respective 32×32 block in that they are not immediately adjacent to the 32×32 block.

In either the first example or the second example, the first 32×32 block, i.e., the upper left 32×32 sub-block of the 64×64 block, can be intra-predicted in the same way as specified by HEVC. In particular, neighboring samples for spatial neighboring blocks, which are outside of the 64×64 block, ordinarily will be reconstructed and available for intra-prediction of the upper left 32×32 block. However, predicted samples or reconstructed samples may be used for some 32×32 blocks in the first example, whereas only reconstructed samples are used in the second example.

The first example, where reconstructed or predicted samples may be used for intra-prediction of some 32×32 blocks of the 64×64 block, will now be described. With reference to FIG. 8, for example, left neighboring samples 182, above left neighboring sample 184, and above neighboring samples 186 for 64×64 block 170 ordinarily will be reconstructed and available for used by video encoder 20 and video decoder 30 in intra-prediction of upper left 32×32 intra block 172.

Upper left block 172 may be intra-predicted, depending on the intra prediction mode, using any of the following reconstructed samples RecSample[i][j]: reconstructed left neighboring samples 182 with RecSample[i][j] at i=−1, j=32 to 63 as below left reconstructed samples, reconstructed left neighboring samples 182 with RecSample[i][j] at i=−1, j=0 to 31 as left reconstructed samples, reconstructed above left neighboring sample 184 with RecSample[i][j] at i=−1, j=−1 as the above left reconstructed sample, reconstructed above neighboring samples 186 with RecSample[i][j] at i=0 to 31, j=−1 as above reconstructed samples, and above neighboring samples 186 with RecSample[i][j] at i=32 to 63, j=−1, as above right reconstructed samples. Again, the four sub-blocks 172, 174, 176, 178 each have the same intra mode, and the particular samples, from among the available reconstructed and/or predicted samples, used to predict the sub-blocks will depend on the selected intra mode.

In general, to define predicted reference samples that can be used by video encoder 20 and video decoder 30, i.e., the predicted samples that are available for intra-prediction of the particular 32×32 block, let PredSample[x][y] be the predicted sample of the 64×64 block, with x=0 through x=63, y=0 through y=63, where x and y are the vertical and horizontal positions, respectively, of a sample relative to the top-left sample, at x=0, y=0, of 64×64 block 170.

For each of the other three 32×32 blocks, i.e., blocks 174, 176 and 178, besides any available neighboring reconstructed samples, predicted samples PredSample[i][j] of preceding 32×32 blocks (i.e., previously predicted 32×32 blocks) of the 64×64 block may also be used as neighboring samples in the intra prediction process. The predicted samples may be predicted but not yet reconstructed, as the 64×64 block in which the 32×32 blocks reside is being coded.

To intra-predict upper right 32×32 intra block 174, the reference samples available to video encoder 20 and video decoder 30 for intra-prediction may include the portion of reconstructed above neighboring samples 186 that resides above upper right 32×32 intra block 174 and a portion of the reconstructed above right neighboring samples 188 (partially shown in FIG. 8), plus the left neighboring intra-predicted samples 190 of upper left 32×32 intra block 172. Prediction samples 198 of lower left 32×32 intra block 176 may not be available for use as below left samples if they have not been predicted at the time that upper right 32×32 intra block 174 is being predicted.

Accordingly, in some examples, upper right 32×32 intra block 174 may be intra-predicted without using below left samples. In this case, for some intra modes, video encoder 20 and video decoder 30 may intra-predict upper right 32×32 intra block 174 using neighboring reconstructed samples, left neighboring intra-predicted samples 190, instead of reconstructed reference samples, or left neighboring intra-predicted samples 190 in conjunction with reconstructed neighboring reference samples. Hence, the neighboring predicted samples that are available to intra-predict upper right 32×32 intra block 174 are from upper left 32×32 intra block 172, which precedes the upper right 32×32 intra block in coding order. In each case, the reconstructed or predicted samples available for intra-prediction neighbor upper right 32×32 intra block 174.

When predicting the second, upper right 32×32 block 174, PredSample[i][j] with i=31, j=0 to 31 is used as the left neighboring samples, in a simple manner similar to performing an Intra prediction for a 32×32 block in the same relative position as in HEVC with reconstructed samples. In this case, predicted samples 190, with PredSample[i][j] at i=31, j=0 to 31, that have been predicted for upper left block 172 serve as the left neighboring samples for intra-prediction of upper-right block 174. For upper-right 32×32 block 174, the above left sample may be the reconstructed sample with RecSample[i][j] at i=31, j=−1, the above samples are the samples with RecSample[i][j] at i=32-63, j=−1, and the above right samples are the samples with RecSample[i][j] at i=64-95, j=−1, all of which may be available from the previously coded (e.g., previously coded in raster order) neighboring blocks above 64×64 block 170.

To intra-predict lower left 32×32 intra block 176, the reference samples available to video encoder 20 and video decoder 30 for intra-prediction may include the portion of reconstructed left neighboring samples 182 that reside to the left of lower left 32×32 intra block 176 as left samples, a portion of reconstructed left neighboring samples 182 that resides to the above left of lower left 32×32 intra block 176 as the above left sample, plus the above neighboring intra-predicted samples 192 of upper left 32×32 intra block 172 as above samples, and the above right intra-predicted samples 196 of upper right 32×32 intra block 174 as above right samples. In this case, for some intra modes, video encoder 20 and video decoder 30 may intra-predict lower left 32×32 intra block 176 using neighboring reconstructed samples, above neighboring intra-predicted samples 192, 196 instead of reconstructed reference samples, or neighboring intra-predicted samples 192, 196 in conjunction with neighboring reconstructed samples, depending on the intra mode. The neighboring intra-predicted samples that are available to intra-predict lower left 32×32 intra block 176 are from upper left 32×32 intra block 172, and upper right 32×32 intra block 174, which precede the lower left 32×32 intra block in coding order.

When predicting the third, lower left 32×32 block 176, PredSample[i][j] with i=0 to 31, j=31 is used as the above neighboring samples, PredSample[i][j] with i=32 to 63, j=31 is used as the above right neighboring samples, in a simple manner similar to performing Intra prediction for a 32×32 block in the same relative position as in HEVC with reconstructed samples. In this case, predicted samples 192, with i=0 to 31, j=31, that have been predicted for upper left block 172 and which neighbor lower left block 176, serve as the above neighboring samples for intra-prediction of lower left block 176, and predicted samples 196, with i=32 to 63, j=31, that have been predicted for upper right block 174 and which neighbor lower left block 716, serve as the above right neighboring samples for intra-prediction of lower left block 176. For lower left 32×32 block 176, the above left sample may be the reconstructed sample with RecSample[i] [j] at i=−1, j=31, and the left samples are the samples with RecSample[i][j] at i=−1, j=32 to 63, all of which may be available from the previously coded (e.g., previously coded in raster order) blocks to the left of 64×64 block 170.

To intra-predict lower right 32×32 intra block 178, the reference samples available to video encoder 20 and video decoder 30 for intra-prediction may include only neighboring predicted samples from adjacent 32×32 blocks. For example, the reference samples available to video encoder 20 and video decoder 30 for intra-prediction of lower right 32×32 intra block 178 may not include reconstructed samples, and instead may include above left neighboring predicted sample 194 from upper left 32×32 intra block 172, above neighboring predicted samples 196 from upper right 32×32 intra block 174, and left neighboring predicted samples 198 from lower left 32×32 intra block 176.

When predicting the fourth, lower right 32×32 block, PredSample[31][31] is used as the above left neighboring sample, prediction samples with PredSample[i][j] at i=31, j=32 . . . 63 are used as the left neighboring samples and prediction samples with PredSample[i][j] at i=32 . . . 63, j=31 are used as the above neighboring samples, respectively, in a simple manner similar to performing Intra prediction for a 32×32 block in the same relative position as in HEVC with reconstructed samples. In this example, for lower right 32×32 intra block 178, predicted neighboring samples from blocks 172, 174, 176 are used. Hence, in one example, no reconstructed neighboring samples are used for intra-prediction of lower right 32×32 intra block 178, and only predicted neighboring samples are used. Also, lower right 32×32 intra block 178 may be predicted without using below left or above right reference samples.

In this case, video encoder 20 and video decoder 30 intra-predict lower right 32×32 intra block 178 using only neighboring intra-predicted samples from adjacent 32×32 blocks of the 64×64 block, instead of reconstructed reference samples. Hence, in this example, reconstructed reference samples are not used by video encoder 20 and video decoder 30 for intra-prediction of lower right 32×32 intra block 178. Instead, only neighboring predicted samples are used from 32×32 intra blocks 172, 174, 176 that precede lower right 32×32 intra block 178 in coding order.

For each of the 32×32 blocks 172, 174, 176, 178 of 64×64 intra block 170, the particular reference samples selected from the available predicted and/or reconstructed reference samples by video encoder 20 and video decoder 30 will depend on the particular intra mode selected for coding the 32×32 intra block. By splitting the 64×64 block into four 32×32 blocks, the intra prediction process can be simplified. In some examples, processing smaller blocks may reduce memory buffer requirements in video encoder 20 or video decoder 30.

In a second example, as an alternative to using predicted neighboring samples, only neighboring reconstructed samples RecSample[i] [j] that neighbor the current 64×64 block 170 are used for predicting all four 32×32 blocks 172, 174, 176, 178. In this example, predicted samples from blocks 172, 174, 176 are not used to intra-predict blocks 174, 176 and 178. Instead, reconstructed samples that neighbor 64×64 block 170 are used for intra-prediction of the blocks 174, 176, 178, even though some of the reconstructed samples that neighbor the larger, 64×64 block 170 do not neighbor a given 32×32 sub-block 174, 176, 178.

In general, to define the reconstructed reference samples that can be used by video encoder 20 and video decoder 30, i.e., that are available for intra-prediction of a particular 32×32 block, again let RecSample[x] [y] be the reconstructed neighboring sample of the 64×64 block, with x=−1, y=−1 . . . 63, or x=0 . . . 63, y=−1, where x and y are the vertical and horizontal positions, respectively, of a reconstructed sample relative to the top-left sample of the 64×64 block 170 at x=0, y=0.

In this second example, the first, upper left 32×32 block is predicted in the same way as in HEVC or the above first example. That is, the first, upper left 32×32 block still may be predicted using the same process normally used in HEVC for intra-prediction, e.g., for a 32×32 block. In particular, when intra-predicting the first, upper left 32×32 intra block 172, video encoder 20 and video decoder 30 may use any of the following reconstructed neighboring samples RecSample[i][j]: reconstructed left samples 182 with RecSample[i] [j] at i=−1, j=32-63 as bottom left reconstructed samples, reconstructed left samples 182 with RecSample[i][j] at i=−1, j=0-31 as left reconstructed samples, reconstructed above left sample 184 with RecSample[i][j] at i=−1, j=−1 as the above left reconstructed sample, reconstructed above samples 186 with RecSample[i] [j] at i=0-31, j=−1 as above reconstructed samples, and reconstructed above samples 186 with RecSample[i][j] at i=32-63, j=−1 as above right reconstructed samples.

For each of the other three 32×32 blocks (upper right block 174, lower left block 176 and lower right block 178), besides reconstructed samples that actually neighbor such blocks (e.g., above left, above and above right reconstructed samples that neighbor upper right block 174, and left and above left reconstructed samples that neighbor lower left block 176, but no reconstructed samples that neighbor lower right block 178), additional reconstructed samples RecSample[i] [j] are also used as reference samples in the intra prediction process, as described below.

When predicting the second, upper right 32×32 block 174, reconstructed samples RecSample[i][j] with i=−1, j=0 to 31 are used by video encoder 20 and video decoder 30 as the left samples for intra-prediction of upper right 32×32 intra block 174, even though these reconstructed samples do not neighbor, i.e., are not immediately adjacent to, upper right 32×32 intra block 174. Video encoder 20 and video decoder 30 also may use reconstructed left samples 182 with RecSample[i][j] at i=−1, j=32-63 as bottom left reconstructed samples for upper right 32×32 intra block 174. Again, like the left reconstructed samples, these bottom left reconstructed samples do not neighbor, i.e., are not immediately adjacent to, upper right 32×32 intra prediction block 174.

In addition to the non-neighboring, i.e., non-adjacent, reconstructed samples, video encoder 20 and video decoder 30 may use reconstructed samples that do actually neighbor, i.e., are adjacent to, upper right 32×32 intra block 174 of the 64×64 block 170. For example, other reconstructed samples that may be used for intra prediction of upper right 32×32 intra block 174 include a portion of reconstructed samples 186 with RecSample[i] [j] at i=31, j=−1 as the above left reconstructed sample, reconstructed samples 186 with RecSample[i][j] at i=32-63, j=−1 as above reconstructed samples, and a portion of reconstructed samples 188 with RecSample[i][j] at i=64-95, j=−1 as above right reconstructed samples. Accordingly, to intra predict upper right 32×32 intra block 174 of 64×64 intra block 170, video encoder 20 and video decoder 30 may use reconstructed samples that neighbor, i.e., are adjacent to, the top of the 32×32 block 174 and reconstructed samples that neighbor the left of the 64×64 block but do not neighbor the left of the 32×32 block 174.

When predicting the third, lower left 32×32 block 176 of the 64×64 block 170, neighboring reconstructed samples 182 with RecSample[i][j] at i=−1, j=32 to 63 are used by video encoder 20 and video decoder 30 as the left neighboring samples. In this example, the neighboring reconstruction sample 182 with RecSample[i][j] at i=−1 and j=31 can be used as the above left neighboring reconstructed sample for intra prediction for lower left, 32×32 intra block 176. Hence, some of the reconstructed samples used for intra prediction may neighbor both 64×64 block 170 and lower left 32×32 intra block.

In addition, video encoder 20 and video decoder 30 may use reconstructed samples that neighbor 64×64 block 170, but do not neighbor, i.e., are not immediately adjacent to, lower left 32×32 intra block 176 for intra prediction of that block. For example, when intra-predicting the third, lower left 32×32 block 176 of the 64×64 block 170, reconstructed samples 186 with RecSample[i][j] at i=0 to 31, j=−1 may be used by video encoder 20 and video decoder 30 as the above reconstructed samples for intra prediction. In addition, reconstructed samples 186 with RecSample[i][j] at i=32 to 63, j=−1 may be used by video encoder 20 and video decoder 30 as above right reconstructed samples for lower left 32×32 intra block 176. Accordingly, to intra predict lower left 32×32 intra block 176 of 64×64 intra block 170, video encoder 20 and video decoder 30 may use, depending on the particular intra mode, reconstructed samples that neighbor, i.e., are adjacent to, the left of the 32×32 block 176 and neighboring reconstructed samples that neighbor the top of the 64×64 block 170 but do not neighbor the top of the lower left 32×32 block 176.

When predicting the fourth, lower right 32×32 block 178, video encoder 20 and video decoder 30 may use reconstruction samples that do not neighbor, i.e., are not immediately adjacent to, the 32×32 block. For example, video encoder 20 and video decoder 30 may use neighboring reconstructed samples for lower right 32×32 intra block 178 that neighbor 64×64 block 170, but do not neighbor 32×32 block 178, as follows: a reconstructed sample 182 with RecSample[i][j] at i=−1 and j=31 may be used as the above left sample, reconstructed samples 182 with RecSample[i][j] at i=−1, j=32 to 63 may be used as the left samples, and reconstructed samples 186 with RecSample[i][j] at i=32 to 63, j=−1 may be used as the above samples. In some examples, for lower right 32×32 intra block 178, video encoder 20 and video decoder 30 may also use a portion of reconstructed samples 188 with RecSample[i][j] at i=64 to 95, j=−1 as above right samples.

For each of the first and second examples above, video encoder 20 may generate residual data indicating a difference between the pixels of the coded 64×64 block and the corresponding four predictive 32×32 blocks of intra-predictive samples. The residual data may include, in the case of regular residual coding, multiple residual values indicating differences on sample-by-sample basis between the pixels of the original 64×64 block and the corresponding predictive samples of the four 32×32 predicted blocks. Alternatively, in the case of SDC, the residual data may be a single delta DC value that represents a difference between an average value of the pixels in the original 64×64 block and the average value of the predictive samples of the four 32×32 predicted blocks, or, alternatively, a difference between an average value of the pixels in the original 64×64 block and the average value of four predictive samples including the top left pixel of the upper left predicted block 172, top right pixel of the upper right predicted block 174, bottom left pixel of the lower left predicted block 176, and bottom right pixel of the lower right predicted block 178. In either case, video encoder 20 may encode syntax information indicating an intra-coding mode for the 64×64 block and the residual data for the 64×64 block. Video decoder 30 may predict the 64×64 block using the syntax information and reconstruct the block by summing the residual with the predicted block. When an intra SDC 64×64 mode is indicated, video decoder 30 may process the intra SDC 64×64 block of depth data as four 32×32 intra-predicted sub-blocks. In this manner, basically, prediction of the 64×64 block is processed in four 32×32 sub-blocks; however, the residual is calculated for the 64×64 block and the intra prediction mode is also signaled for the 64×64 block, instead of the 32×32 sub-blocks. For example, encoder 20 may encode, and decoder 30 may decode, syntax information indicating the 64×64 intra SDC mode and residual data indicating a difference between the pixel values of the 64×64 block and the intra-predicted samples of the 32×32 blocks.

In each of the first and second examples above, when SDC applies, no transform is required. So, more generically, if such methods are also applied to non-SDC intra prediction with regular residual coding, the methods would apply only to the cases where, if a transform is applied, the maximum transform size is no larger than the intra prediction block size, e.g., 32×32. For example, in addition, the above methods can be used to enable normal 64×64 Intra prediction in 3D-HEVC for depth coding, but may be limited to coding with transform sizes of less than or equal to 32×32.

Figure 9:
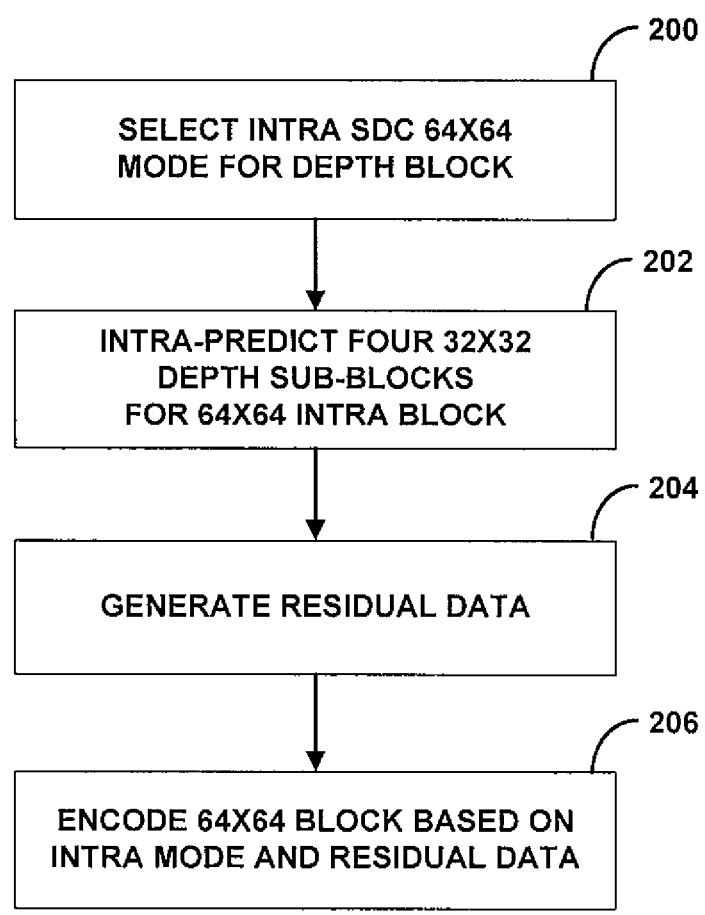
FIG. 9 is a flow diagram illustrating a method for encoding a 64×64 intra depth block according to an example of this disclosure.

FIG. 9 is a flow diagram illustrating a method for encoding a 64×64 intra depth block according to an example of this disclosure. In the example of FIG. 9, video encoder 20 selects an intra SDC 64×64 mode for encoding a depth block (200), e.g., in a 3D-HEVC process. When the intra 64×64 mode is selected, video encoder 20 intra-predicts the 64×64 block using four 32×32 blocks for the 64×64 intra block (202), i.e., sub-blocks, as described in this disclosure. Video encoder 20 then generates residual data indicating differences between the pixels of the original 64×64 block and the intra-predictive samples of the four 32×32 predicted sub-blocks (204), and encodes the intra 64×64 block based on the intra-prediction mode for the 64×64 block and the residual data (206). For example, video encoder 20 may signal syntax information indicating the 64×64 intra mode for the 64×64 depth block, and hence the intra mode used to predict samples for each of the 32×32 sub-blocks, and the residual data for the 64×64 block. In the case of intra SDC, in some examples, the residual data may comprise a delta DC value for the 64×64 block or partition thereof. The delta DC value need not be transformed or quantized for encoding in the bitstream. In the case of regular residual coding, the bitstream may included quantized transform coefficients representing the residual data.

Figure 10:
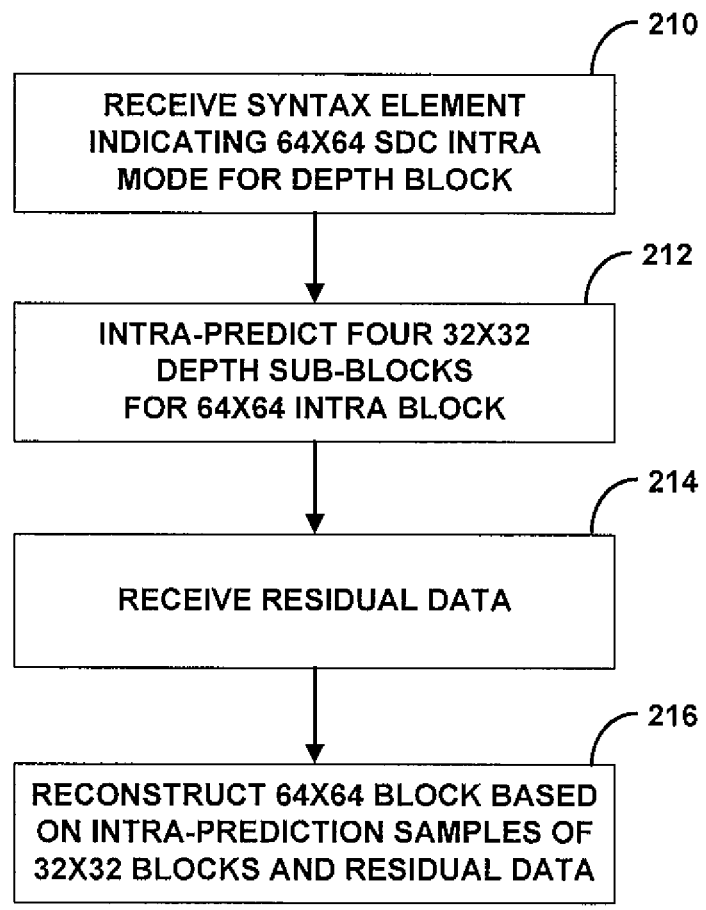
FIG. 10 is a flow diagram illustrating a method for decoding a 64×64 intra depth block according to an example of this disclosure.

FIG. 10 is a flow diagram illustrating a method for decoding a 64×64 intra depth block according to an example of this disclosure. In the example of FIG. 10, a video decoder 210 receives, in an encoded video bitstream, syntax information indicating an SDC 64×64 intra mode for a 64×64 depth block to be decoded, e.g., in a 3D-HEVC process. In response to the syntax information indicating the SDC intra 64×64 mode, video decoder 30 intra-predicts four 32×32 depth sub-blocks for the 64×64 depth block (212), e.g., using the same intra mode for each of the sub-blocks, and receives residual data for the 64×64 block (214). For example, video decoder 30 may decode the residual data from the bitstream. Again, the residual data may be generated by SDC, with no transforms or quantization, or regular residual coding, in which case video decoder 30 may apply inverse quantization and inverse transformation to obtain the residual data. Video decoder 30 reconstructs the depth data of the 64×64 intra-coded block based on the intra-prediction samples from the four 32×32 blocks and the residual data received for the 64×64 block (216).

Although 64×64 and 32×32 blocks are described for purposes of example and illustration, in other examples, the techniques described in this disclosure may be applied to larger blocks. For example, an intra 128×128 block may be processed as four 64×64 blocks, or a 256×256 block may be processed as four 128×128 blocks. Accordingly, concepts applied to 64×64 and 32×32 blocks may be considered applicable to larger blocks.

In some examples, the reference samples that are available to video encoder 20 and/or video decoder 30 for intra-prediction of the samples of at least some of the 32×32 blocks include intra-predicted reference samples from one or more of the other 32×32 blocks. As another example, reference samples that are available for intra-prediction of the samples of at least some of the 32×32 blocks include intra-predicted reference samples from one or more of the other 32×32 blocks that neighbor the respective 32×32 block. As another example, reference samples that are available for intra-prediction of the samples of at least some of the 32×32 blocks include intra-predicted reference samples from one or more of the other 32×32 blocks that neighbor the respective 32×32 block and reconstructed samples that neighbor the 64×64 block and the respective 32×32 block.

In another example, reference samples that are available to video encoder 20 and/or video decoder 30 for intra-prediction of the samples of at least some of the 32×32 blocks include reconstructed samples that neighbor the 64×64 block. As another example, reference samples that are available for intra-prediction of the samples of at least some of the 32×32 blocks include reconstructed samples that neighbor the 64×64 block but do not neighbor the respective 32×32 block.

Accordingly, in various examples, video encoder 20 or video decoder 30 may be configured to intra-predict the samples of the 32×32 blocks using intra-predicted reference samples from one or more of the other 32×32 blocks, intra-predict the samples of the 32×32 blocks using intra-predicted reference samples from one or more other 32×32 blocks that neighbor the respective 32×32 block, intra-predict the samples of the 32×32 blocks using reference samples from one or more of the other 32×32 blocks that neighbor the respective 32×32 block and reconstructed samples that neighbor the 64×64 block and the respective 32×32 block, intra-predict the samples of the 32×32 blocks using reconstructed samples that neighbor the 64×64 block, or intra-predict the samples of the 32×32 blocks using reconstructed samples that neighbor the 64×64 block but do not neighbor the respective 32×32 block.

Video decoder 30 may perform a method of decoding depth data for video coding, the method comprising, for an intra-prediction mode for a first block of depth data, intra-predicting samples of the depth data for second blocks, wherein the second blocks comprise four blocks each having an equal size that is one-quarter of a size of the first block of depth data, and correspond to upper left, upper right, lower left and lower right blocks of the first block of depth data, receiving residual data for the first block of depth data indicating a difference between pixel values of the first block and the intra-predicted samples of the second blocks, and reconstructing the first block of depth data based on the intra-predicted samples for the second blocks and the residual data. The residual data may comprise, in some examples, DC residual data indicating a difference between an average value of the pixel values of the first block and an average value of the intra-predicted samples of the second blocks.

Video encoder 20 may perform a method encoding depth data for video coding, the method comprising, for an intra-prediction mode for a first block of depth data, intra-predicting samples of the depth data for second blocks, wherein the second blocks comprise four blocks each having an equal size that is one-quarter of a size of the first block of depth data, and correspond to upper left, upper right, lower left and lower right blocks of the first block of depth data, generating residual data for the first block of depth data based on a difference between pixel values of the first block and the intra-predicted samples of the second blocks, and encoding the first block of depth data based on the intra-prediction mode and the residual data. The residual data may comprise, in some examples, DC residual data indicating a difference between an average value of the pixel values of the first block and an average value of the intra-predicted samples of the second blocks.

The various intra coding techniques described in this disclosure may be performed by video encoder 20 (FIGS. 3 and 5) and/or video decoder 30 (FIGS. 3 and 7), both of which may be generally referred to as a video coder. In addition, video coding may generally refer to video encoding and/or video decoding, as applicable.

While the techniques of this disclosure are generally described with respect to 3D-HEVC, the techniques are not necessarily limited in this way. The techniques described above may also be applicable to other current standards or future standards for 3D video coding.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding depth data for video decoding, the method comprising:
  decoding a block of depth data according to an intra segment-wise DC coding (SDC) mode in a three-dimensional extension of a high efficiency video coding standard (3D-HEVC), at least in part by:
    determining that the block of depth data has a size of 64×64 pixels;
    based on the block of depth data having the size of 64×64 pixels, determining that the block of depth data exceeds a maximum transform size defined in the high efficiency video coding standard (HEVC);
    intra-predicting samples of depth data for four sub-blocks of the block of depth data, wherein each respective sub-block of the four sub-blocks has a respective size of 32×32 pixels, and wherein the four sub-blocks correspond to an upper left sub-block, an upper right sub-block, a lower left sub-block, and a lower right sub-block of the block of depth data;
    receiving DC residual data for the block of depth data, the DC residual data indicating a difference between an average value of sample values of the block of depth data and an average value of the intra-predicted samples of one or more of the four sub-blocks; and
    reconstructing the block of depth data based on the received DC residual data and the intra-predicted samples of the one or more of the four sub-blocks.

2. The method of claim 1, wherein reference samples that are available for intra-prediction of the intra-predicted samples of at least one of the four sub-blocks include intra-predicted reference samples from one or more of the four sub-blocks other than the at least one sub-block.

3. The method of claim 1, wherein reference samples that are available for intra-prediction of the intra-predicted samples of at least one of the four sub-blocks include intra-predicted reference samples from one or more of the four sub-blocks that neighbor the at least one sub-block.

4. The method of claim 1, wherein reference samples that are available for intra-prediction of the samples of at least one of the four sub-blocks include intra-predicted reference samples from one or more of four sub-blocks that neighbor the at least one sub-block and reconstructed samples that neighbor the block of depth data and the at least one sub-block.

5. The method of claim 1, wherein reference samples that are available for intra-prediction of the samples of at least one of the four sub-blocks include reconstructed samples that neighbor the block of depth data.

6. The method of claim 1, wherein reference samples that are available for intra-prediction of the samples of at least one of the four sub-blocks include reconstructed samples that neighbor the block of depth data and do not neighbor the at least one sub-block.

7. The method of claim 1, wherein intra-predicting the samples of depth data for a first sub-block of the four sub-blocks comprises intra-predicting the samples using intra-predicted reference samples from one or more of the four sub-blocks other than the first sub-block.

8. The method of claim 1, wherein intra-predicting the samples of depth data for a first sub-block of the four sub-blocks comprises intra-predicting the samples using intra-predicted reference samples from one or more of the four sub-blocks that neighbor the first sub-block.

9. The method of claim 1, wherein intra-predicting the samples of depth data for a first sub-block of the four sub-blocks comprises intra-predicting the samples using reference samples from one or more of the four sub-blocks that neighbor the first sub-block and reconstructed samples that neighbor the block of depth data and the first sub-block.

10. The method of claim 1, wherein intra-predicting the samples of depth data for a first sub-block of the four sub-blocks comprises intra-predicting the samples using reconstructed samples that neighbor the block of depth data.

11. The method of claim 1, wherein intra-predicting the samples of depth data for the four sub-blocks comprises intra-predicting the samples using reconstructed samples that neighbor the block of depth data and do not neighbor the first sub-block.

12. A method of encoding depth data for video encoding, the method comprising:
  encoding a block of depth data according to an intra segment-wise DC coding (SDC) mode in a three-dimensional extension of a high efficiency video coding standard (3D-HEVC), at least in part by:
    determining that the block of depth data has a size of 64×64 pixels;
    based on the block of depth data having the size of 64×64 pixels, determining that the block of depth data exceeds a maximum transform size defined in the high efficiency video coding standard (HEVC);
    intra-predicting samples of depth data for four sub-blocks of the block of depth data, wherein each respective sub-block of the four sub-blocks has a respective size of 32×32 pixels, and wherein the four sub-blocks correspond to an upper left sub-block, an upper right sub-block, a lower left sub-block, and a lower right sub-block of the block of depth data;
    generating DC residual data for the block of depth data, the DC residual data being based on a difference between an average value of sample values of the block and an average value of the intra-predicted samples of one or more of the four sub-blocks;
    encoding the block of depth data according to the intra SDC mode and using the DC residual data; and
    signaling the DC residual data in an encoded video bitstream.

13. The method of claim 12, wherein reference samples that are available for intra-prediction of the samples of at least one of the four sub-blocks include intra-predicted reference samples from one or more of the four sub-blocks other than the at least one sub-block.

14. The method of claim 12, wherein reference samples that are available for intra-prediction of the samples of at least one of the four sub-blocks include intra-predicted reference samples from one or more of the four sub-blocks that neighbor the at least one sub-block.

15. The method of claim 12, wherein reference samples that are available for intra-prediction of the samples of at least one of the four sub-blocks include intra-predicted reference samples from one or more of the four sub-blocks that neighbor the at least one sub-block and reconstructed samples that neighbor the block of depth data and the at least one sub-block.

16. The method of claim 12, wherein reference samples that are available for intra-prediction of the samples of at least one of the four sub-blocks include reconstructed samples that neighbor the block of depth data.

17. The method of claim 12, wherein reference samples that are available for intra-prediction of the samples of at least one of the four sub-blocks include reconstructed samples that neighbor the block of depth data and do not neighbor the at least one sub-block.

18. The method of claim 12, wherein intra-predicting the samples of depth data for a first sub-block of the four sub-blocks comprises intra-predicting the samples using intra-predicted reference samples from one or more of the four sub-blocks other than the first sub-block.

19. The method of claim 12, wherein intra-predicting the samples of depth data for a first sub-block of the four sub-blocks comprises intra-predicting the samples using intra-predicted reference samples from one or more of the four sub-blocks that neighbor the first sub-block.

20. The method of claim 12, wherein intra-predicting the samples of depth data for a first sub-block of the four sub-blocks comprises intra-predicting the samples using reference samples from one or more of the four sub-blocks that neighbor the first sub-block and reconstructed samples that neighbor the block of depth data and the first sub-block.

21. The method of claim 12, wherein intra-predicting the samples of depth data for a first sub-block of the four sub-blocks comprises intra-predicting the samples using reconstructed samples that neighbor the block of depth data.

22. The method of claim 12, wherein intra-predicting the samples of depth data for the four sub-blocks comprises intra-predicting the samples using reconstructed samples that neighbor the block of depth data and do not neighbor the first sub-block.

23. A device for coding depth data for video coding, the device comprising:
  a memory storing depth data for video content; and
  one or more processors in communication with the memory, the one or more processors being configured to:
    code a block of the depth data stored to the memory according to an intra segment-wise DC coding (SDC) mode in a three-dimensional extension of a high efficiency video coding standard (3D-HEVC), wherein to code the block of the depth data, the one or more processors are configured to:
      determine that the block of depth data has a size of 64×64 pixels;
      determine, based on the block of depth data having the size of 64×64 pixels, that the block of depth data exceeds a maximum transform size defined in the high efficiency video coding standard (HEVC);
      intra-predict samples of depth data for four sub-blocks of the block of depth data, wherein each respective sub-block of the four sub-blocks has a respective size of 32×32 pixels, and wherein the four sub-blocks correspond to an upper left sub-block, an upper right sub-block, a lower left sub-block, and a lower right sub-block of the block of depth data;
      determine DC residual data for the block of depth data, the DC residual data indicating a difference between an average value of sample values of the block of depth data and an average value of intra-predicted samples of one or more of the four sub-blocks; and
      code the block of depth data according to the intra-prediction mode based on the DC residual data and the intra-predicted samples of the one or more of the four sub-blocks.

24. The device of claim 23, wherein the device is a video decoder, wherein the video decoder further comprises an interface in communication with the one or more processors, and wherein the one or more processors are further configured to:
  receive, via the interface, syntax information identifying the intra SDC mode;
  receive, via the interface, the DC residual data; and
  reconstruct the block of depth data based on the intra-predicted samples of the one or more of the four sub-blocks and the DC residual data to code the block of depth data.

25. The device of claim 23, wherein the device is a video encoder, wherein the video encoder further comprises an interface in communication with the one or more processors, and wherein the one or more processors are further configured to:

select the intra SDC mode from a plurality of intra-prediction modes;

generate the DC residual data;

encode the block of depth data according to the intra SDC mode, using the residual data, to code the block of depth data; and signal the DC residual data via the interface.

26. The device of claim 23, wherein reference samples that are available for intra-prediction of the samples of at least one of the four sub-blocks include intra-predicted reference samples from one or more of the four sub-blocks other than the at least one sub-block.

27. The device of claim 23, wherein reference samples that are available for intra-prediction of the samples of at least one of the four sub-blocks include intra-predicted reference samples from one or more of four sub-blocks that neighbor the at least one sub-block.

28. The device of claim 23, wherein reference samples that are available for intra-prediction of the samples of at least one of the four sub-blocks include intra-predicted reference samples from one or more of the four sub-blocks that neighbor the at least one sub-block and reconstructed samples that neighbor the block of depth data and the at least one sub-block.

29. The device of claim 23, wherein reference samples that are available for intra-prediction of the samples of at least one of the four sub-blocks include reconstructed samples that neighbor the block of depth data.

30. The device of claim 23, wherein reference samples that are available for intra-prediction of the samples of at least one of the four sub-blocks include reconstructed samples that neighbor the block of depth data and do not neighbor the at least one sub-block.

31. The device of claim 23, wherein the one or more processors are configured to intra-predict the samples of depth data for a first sub-block of the four sub-blocks using intra-predicted reference samples from one or more of the four sub-blocks other than the first sub-block.

32. The device of claim 23, wherein the one or more processors are configured to intra-predict the samples of depth data for a first sub-block of the four sub-blocks using intra-predicted reference samples from one of more of the four sub-blocks other than the first sub-block that neighbor the first sub-block.

33. The device of claim 23, wherein the one or more processors are configured to intra-predict the samples of depth data for a first sub-block of the four sub-blocks using reference samples from one of more of the four sub-blocks that neighbor the first sub-block and reconstructed samples that neighbor the block of depth data and the first sub-block.

34. The device of claim 23, wherein the one or more processors are configured to intra-predict the samples of depth data for a first sub-block of the four sub-blocks using reconstructed samples that neighbor the block of depth data.

35. The device of claim 23, wherein the one or more processors are configured to intra-predict the samples of depth data for a first sub-block of the four sub-block using reconstructed samples that neighbor the block of depth data and do not neighbor the first sub-block.

36. A device for coding depth data for video coding, the device comprising:

means for storing depth data for video content;

means for coding a block of the stored depth data according to an intra segment-wise DC coding (SDC) mode in a three-dimensional extension of a high efficiency video coding standard (3D-HEVC), wherein the means for coding comprises:

means for determining that the block of depth data has a size of 64×64 pixels;

means for determining, based on the block of depth data having the size of 64×64 pixels, that the block of depth data exceeds a maximum transform size defined in the high efficiency video coding standard (HEVC);

means for intra-predicting samples of depth data for four sub-blocks of the block of the stored depth data, wherein each respective sub-block of the four sub-blocks has a respective size of 32×32 pixels, and wherein the four sub-blocks correspond to an upper left sub-block, an upper right sub-block, a lower left sub-block, and a lower right sub-block of the block of depth data;

means for determining DC residual data for the block of the stored depth data, the DC residual data indicating a difference between an average value of sample values of the block of depth data and an average value of intra-predicted samples of one or more of the four sub-blocks; and means for coding the block of the stored depth data according to the intra SDC mode based on the residual data and the intra-predicted samples of the one or more of the four sub-blocks.

37. A non-transitory computer-readable storage medium encoded with instructions that, when executed, cause one or more processors of a video coding device to:

store, to the non-transitory computer-readable storage medium, depth data for video content;

code a block of the stored depth data according to an intra segment-wise DC coding (SDC) mode in a three-dimensional extension of a high efficiency video coding standard (3D-HEVC), wherein the instructions to code the block of the stored depth data comprise instructions that, when executed, cause the one or more processors to:

determine that the block of depth data has a size of 64×64 pixels;

determine, based on the block of depth data having the size of 64×64 pixels, that the block of depth data exceeds a maximum transform size defined in the high efficiency video coding standard (HEVC);

intra-predict samples of depth data for four sub-blocks of the block of the stored depth data, wherein each respective sub-block of the four sub-blocks has a respective size of 32×32 pixels, and wherein the four sub-blocks correspond to an upper left sub-block, an upper right sub-block, a lower left sub-block, and a lower right sub-block of the block of depth data;

determine DC residual data for the block of the stored depth data, the DC residual data indicating a difference between an average value of sample values of the block of the stored depth data and an average value of intra-predicted samples of one or more of the four sub-blocks; and code the block of depth data according to the intra SDC mode based on the DC residual data and the intra-predicted samples of the one or more of the four sub-blocks.

38. The device of claim 36, wherein reference samples that are available for intra-prediction of the samples of at least one of the four sub-blocks include intra-predicted reference samples from one or more of the four sub-blocks other than the at least one sub-block.

39. The device of claim 36, wherein reference samples that are available for intra-prediction of the samples of at least one of the four sub-blocks include intra-predicted reference samples from one or more of the four sub-blocks that neighbor the at least one sub-block.

40. The device of claim 36, wherein reference samples that are available for intra-prediction of the samples of at least one of the four sub-blocks include intra-predicted reference samples from one or more of the four sub-blocks that neighbor the at least one sub-block and reconstructed samples that neighbor the block of depth data and the at least one sub-block.

41. The non-transitory computer-readable storage medium of claim 37, wherein reference samples that are available for intra-prediction of the samples of at least one of the four sub-blocks include intra-predicted reference samples from one or more of the four sub-blocks other than the at least one sub-block.

42. The non-transitory computer-readable storage medium of claim 37, wherein reference samples that are available for intra-prediction of the samples of at least one of the four sub-blocks include intra-predicted reference samples from one or more of the four sub-blocks that neighbor the at least one sub-block.

43. The non-transitory computer-readable storage medium of claim 37, wherein reference samples that are available for intra-prediction of the samples of at least one of the four sub-blocks include intra-predicted reference samples from one or more of the four sub-blocks that neighbor the at least one sub-block and reconstructed samples that neighbor the block of depth data and the at least one sub-block.

* * * * *